United States Patent
Walmsley

(10) Patent No.: US 7,996,880 B2
(45) Date of Patent: *Aug. 9, 2011

(54) SECURE UPDATING OF INTEGRATED CIRCUITS

(75) Inventor: Simon Robert Walmsley, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 12/697,272

(22) Filed: Jan. 31, 2010

(65) Prior Publication Data

US 2010/0134541 A1 Jun. 3, 2010

Related U.S. Application Data

(63) Continuation of application No. 10/727,164, filed on Dec. 2, 2003, now Pat. No. 7,707,621.

(30) Foreign Application Priority Data

Dec. 2, 2002 (AU) ................................ 2002953134
Dec. 2, 2002 (AU) ................................ 2002953135

(51) Int. Cl.
*G06F 7/04* (2006.01)
*G06F 17/00* (2006.01)
*G06F 3/00* (2006.01)

(52) U.S. Cl. .................. 726/2; 726/17; 380/255; 347/5; 347/6; 347/7; 710/36

(58) Field of Classification Search .......................... None
See application file for complete search history.

(56) References Cited

U.S. PATENT DOCUMENTS

| | | | |
|---|---|---|---|
| 4,593,384 A | 6/1986 | Kleijne | |
| 4,685,056 A | 8/1987 | Barnsdale et al. | |
| 4,792,910 A * | 12/1988 | Lange | 358/1.16 |
| 4,999,814 A | 3/1991 | Hashimoto | |
| 5,016,276 A | 5/1991 | Matumoto et al. | |
| 5,185,717 A | 2/1993 | Mori | |
| 5,193,012 A | 3/1993 | Schmidt | |
| 5,309,516 A | 5/1994 | Takaragi et al. | |
| 5,315,635 A * | 5/1994 | Kane et al. | 340/7.29 |
| 5,363,447 A | 11/1994 | Rager et al. | |
| 5,375,089 A * | 12/1994 | Lo | 365/189.04 |
| 5,406,627 A | 4/1995 | Thompson et al. | |
| 5,457,748 A | 10/1995 | Bergum et al. | |

(Continued)

FOREIGN PATENT DOCUMENTS

EP 0863004 A2 9/1998

(Continued)

*Primary Examiner* — Nabil M El Hady
*Assistant Examiner* — William S Powers

(57) ABSTRACT

A method of attempting a write to an entity to cause performance of an action is provided in which a first message is sent to the entity which causes performance of the action and adjustment of initial values in respective security fields of the entity to respective first adjusted values, and a second message is sent to the entity which causes adjustment of the initial values to respective second adjusted values. The security fields have write restrictions which prevent values in the security fields being adjusted, in accordance with the first message, if the initial values have been adjusted in accordance with the second message, and vice versa. The action is only performed when the initial values have been adjusted in accordance with the first message. The respective first adjusted values are different than the respective second adjusted values.

8 Claims, 15 Drawing Sheets

U.S. PATENT DOCUMENTS

| | | | |
|---|---|---|---|
| 5,485,245 A | 1/1996 | Kobayashi et al. | |
| 5,581,198 A | 12/1996 | Trimberger | |
| 5,594,839 A | 1/1997 | Shu | |
| 5,621,698 A | 4/1997 | Lee | |
| 5,673,316 A | 9/1997 | Auerbach et al. | |
| 5,701,505 A | 12/1997 | Yamashita et al. | |
| 5,784,642 A * | 7/1998 | Smith et al. | 710/3 |
| 5,796,416 A | 8/1998 | Silverbrook | |
| 5,815,286 A | 9/1998 | Matsuba et al. | |
| 5,983,225 A | 11/1999 | Anfindsen | |
| 6,003,134 A | 12/1999 | Kuo et al. | |
| 6,026,492 A | 2/2000 | Cromer et al. | |
| 6,027,195 A * | 2/2000 | Gauthier et al. | 347/5 |
| 6,064,989 A | 5/2000 | Cordery et al. | |
| 6,065,113 A | 5/2000 | Shiell et al. | |
| 6,113,208 A | 9/2000 | Benjamin et al. | |
| 6,154,195 A | 11/2000 | Young et al. | |
| 6,196,670 B1 * | 3/2001 | Saruta | 347/86 |
| 6,217,165 B1 | 4/2001 | Silverbrook | |
| 6,246,970 B1 | 6/2001 | Silverbrook et al. | |
| 6,283,572 B1 | 9/2001 | Kumar et al. | |
| 6,312,074 B1 | 11/2001 | Walker | |
| 6,314,521 B1 | 11/2001 | Debry | |
| 6,354,689 B1 | 3/2002 | Couwenhoven et al. | |
| 6,385,728 B1 | 5/2002 | DeBry | |
| 6,415,142 B1 | 7/2002 | Martineau | |
| 6,587,947 B1 | 7/2003 | O'Donnell et al. | |
| 6,601,211 B1 | 7/2003 | Norman | |
| 6,651,149 B1 | 11/2003 | Iwasaki | |
| 6,655,768 B1 * | 12/2003 | Takagi | 347/5 |
| 6,667,895 B2 | 12/2003 | Jang et al. | |
| 6,734,538 B1 | 5/2004 | Sturcken | |
| 6,738,788 B1 * | 5/2004 | Horng et al. | 360/234.4 |
| 6,757,831 B1 | 6/2004 | Folmsbee | |
| 7,031,012 B1 * | 4/2006 | Serizawa | 358/1.16 |
| 7,055,029 B2 | 5/2006 | Collins et al. | |
| 7,124,170 B1 | 10/2006 | Sibert | |
| 7,155,590 B2 | 12/2006 | Mathis | |
| 7,165,177 B2 | 1/2007 | Gilbert et al. | |
| 7,178,040 B2 | 2/2007 | Takada et al. | |
| 7,192,114 B2 | 3/2007 | Suzuki et al. | |
| 7,224,803 B2 | 5/2007 | Cheng | |
| 7,271,908 B2 | 9/2007 | Noguchi et al. | |
| 7,273,483 B2 | 9/2007 | Wiener et al. | |
| 7,278,697 B2 | 10/2007 | Plunkett | |
| 7,467,839 B2 | 12/2008 | Walmsley | |
| 7,483,312 B2 | 1/2009 | Fukuda et al. | |
| 7,611,215 B2 | 11/2009 | Walmsley | |
| 2001/0010724 A1 | 8/2001 | Murakami | |
| 2002/0013898 A1 | 1/2002 | Sudia et al. | |
| 2002/0060707 A1 | 5/2002 | Yu et al. | |
| 2002/0093358 A1 * | 7/2002 | Kang | 324/765 |
| 2002/0103999 A1 | 8/2002 | Camnisch et al. | |
| 2002/0116616 A1 | 8/2002 | Mi et al. | |
| 2004/0046811 A1 | 3/2004 | D'Souza et al. | |
| 2005/0286287 A1 | 12/2005 | Park et al. | |

FOREIGN PATENT DOCUMENTS

| | | |
|---|---|---|
| EP | 0963854 A | 12/1999 |
| EP | 0974467 A1 | 1/2000 |
| EP | 0983855 A2 | 3/2000 |
| EP | 1157840 A2 | 11/2001 |
| WO | WO98/40222 A1 | 9/1998 |
| WO | WO 98/40222 A1 | 9/1998 |
| WO | WO 99/08875 A1 | 2/1999 |
| WO | WO99/08875 A1 | 2/1999 |

* cited by examiner

| KeyNum (3 bits) | NonAuthRW (1 bit) | AuthRW (1 bit) | KeyPerms (8 bits) |
|---|---|---|---|
| 16 | 14 | 13 | 12 | 11 | 4 |

FIG. 12

| KeyNum | Non AuthRW | AuthRW | KeyPerms | | | | | | | |
|---|---|---|---|---|---|---|---|---|---|---|
| 3 | 0 | 1 | 0 | 0 | 0 | 0 | 1 | 1 | 0 |

| KeyNum | Non AuthRW | AuthRW | | | KeyPerms | | | | |
|--------|------------|--------|---|---|---|---|---|---|---|
| 3 | 1 | 1 | 0 | 0 | 0 | 0 | 1 | 1 | 0 |

FIG. 15

| 31 | 17 16 | 14 13 | 12 11 | 4 3 | 0 |
|---|---|---|---|---|---|
| Type (15 bits) | KeyNum (3 bits) | NonAuth RW (1 bit) | AuthRW (1 bit) | KeyPerms (8 bits) | EndPos (4 bits) |

SECURE UPDATING OF INTEGRATED CIRCUITS

CROSS REFERENCE TO RELATED APPLICATIONS

The present application is a Continuation of U.S. application Ser. No. 10/727,164 filed Dec. 2, 2003, all of which are herein incorporated by reference.

FIELD OF INVENTION

The present invention relates to prevention of unauthorized use of authenticated messages by an entity (such as an integrated circuit, for example).

The invention has primarily been developed for use in chips used in a printer system to prevent unauthorized updating of ink supply information in an ink cartridge. However, it will be appreciated that the invention can be applied to other fields in which analogous problems are faced.

BACKGROUND OF INVENTION

Manufacturing a printhead that has relatively high resolution and print-speed raises a number of problems.

Difficulties in manufacturing pagewidth printheads of any substantial size arise due to the relatively small dimensions of standard silicon wafers that are used in printhead (or printhead module) manufacture. For example, if it is desired to make an 8 inch wide pagewidth printhead, only one such printhead can be laid out on a standard 8-inch wafer, since such wafers are circular in plan. Manufacturing a pagewidth printhead from two or more smaller modules can reduce this limitation to some extent, but raises other problems related to providing a joint between adjacent printhead modules that is precise enough to avoid visible artifacts (which would typically take the form of noticeable lines) when the printhead is used. The problem is exacerbated in relatively high-resolution applications because of the tight tolerances dictated by the small spacing between nozzles.

The quality of a joint region between adjacent printhead modules relies on factors including a precision with which the abutting ends of each module can be manufactured, the accuracy with which they can be aligned when assembled into a single printhead, and other more practical factors such as management of ink channels behind the nozzles. It will be appreciated that the difficulties include relative vertical displacement of the printhead modules with respect to each other.

Whilst some of these issues may be dealt with by careful design and manufacture, the level of precision required renders it relatively expensive to manufacture printheads within the required tolerances. It would be desirable to provide a solution to one or more of the problems associated with precision manufacture and assembly of multiple printhead modules to form a printhead, and especially a pagewidth printhead.

In some cases, it is desirable to produce a number of different printhead module types or lengths on a substrate to maximise usage of the substrate's surface area. However, different sizes and types of modules will have different numbers and layouts of print nozzles, potentially including different horizontal and vertical offsets. Where two or more modules are to be joined to form a single printhead, there is also the problem of dealing with different seam shapes between abutting ends of joined modules, which again may incorporate vertical or horizontal offsets between the modules. Printhead controllers are usually dedicated application specific integrated circuits (ASICs) designed for specific use with a single type of printhead module, that is used by itself rather than with other modules. It would be desirable to provide a way in which different lengths and types of printhead modules could be accounted for using a single printer controller.

Printer controllers face other difficulties when two or more printhead modules are involved, especially if it is desired to send dot data to each of the printheads directly (rather than via a single printhead connected to the controller). One concern is that data delivered to different length controllers at the same rate will cause the shorter of the modules to be ready for printing before any longer modules. Where there is little difference involved, the issue may not be of importance, but for large length differences, the result is that the bandwidth of a shared memory from which the dot data is supplied to the modules is effectively left idle once one of the modules is full and the remaining module or modules is still being filled. It would be desirable to provide a way of improving memory bandwidth usage in a system comprising a plurality of printhead modules of uneven length.

In any printing system that includes multiple nozzles on a printhead or printhead module, there is the possibility of one or more of the nozzles failing in the field, or being inoperative due to manufacturing defect. Given the relatively large size of a typical printhead module, it would be desirable to provide some form of compensation for one or more "dead" nozzles. Where the printhead also outputs fixative on a per-nozzle basis, it is also desirable that the fixative is provided in such a way that dead nozzles are compensated for.

A printer controller can take the form of an integrated circuit, comprising a processor and one or more peripheral hardware units for implementing specific data manipulation functions. A number of these units and the processor may need access to a common resource such as memory. One way of arbitrating between multiple access requests for a common resource is timeslot arbitration, in which access to the resource is guaranteed to a particular requestor during a predetermined timeslot.

One difficulty with this arrangement lies in the fact that not all access requests make the same demands on the resource in terms of timing and latency. For example, a memory read requires that data be fetched from memory, which may take a number of cycles, whereas a memory write can commence immediately. Timeslot arbitration does not take into account these differences, which may result in accesses being performed in a less efficient manner than might otherwise be the case. It would be desirable to provide a timeslot arbitration scheme that improved this efficiency as compared with prior art timeslot arbitration schemes.

Also of concern when allocating resources in a timeslot arbitration scheme is the fact that the priority of an access request may not be the same for all units. For example, it would be desirable to provide a timeslot arbitration scheme in which one requestor (typically the memory) is granted special priority such that its requests are dealt with earlier than would be the case in the absence of such priority.

In systems that use a memory and cache, a cache miss (in which an attempt to load data or an instruction from a cache fails) results in a memory access followed by a cache update. It is often desirable when updating the cache in this way to update data other than that which was actually missed. A typical example would be a cache miss for a byte resulting in an entire word or line of the cache associated with that byte being updated. However, this can have the effect of tying up bandwidth between the memory (or a memory manager) and the processor where the bandwidth is such that several cycles are required to transfer the entire word or line to the cache. It would be desirable to provide a mechanism for updating a cache that improved cache update speed and/or efficiency.

Most integrated circuits an externally provided signal as (or to generate) a clock, often provided from a dedicated clock generation circuit. This is often due to the difficulties of providing an onboard clock that can operate at a speed that is predictable. Manufacturing tolerances of such on-board clock generation circuitry can result in clock rates that vary by a factor of two, and operating temperatures can increase this margin by an additional factor of two. In some cases, the particular rate at which the clock operates is not of particular concern. However, where the integrated circuit will be writing to an internal circuit that is sensitive to the time over which a signal is provided, it may be undesirable to have the signal be applied for too long or short a time. For example, flash memory is sensitive to being written too for too long a period. It would be desirable to provide a mechanism for adjusting a rate of an on-chip system clock to take into account the impact of manufacturing variations on clockspeed.

One form of attacking a secure chip is to induce (usually by increasing) a clock speed that takes the logic outside its rated operating frequency. One way of doing this is to reduce the temperature of the integrated circuit, which can cause the clock to race. Above a certain frequency, some logic will start malfunctioning. In some cases, the malfunction can be such that information on the chip that would otherwise be secure may become available to an external connection. It would be desirable to protect an integrated circuit from such attacks.

In an integrated circuit comprising non-volatile memory, a power failure can result in unintentional behaviour. For example, if an address or data becomes unreliable due to falling voltage supplied to the circuit but there is still sufficient power to cause a write, incorrect data can be written. Even worse, the data (incorrect or not) could be written to the wrong memory. The problem is exacerbated with multi-word writes. It would be desirable to provide a mechanism for reducing or preventing spurious writes when power to an integrated circuit is failing.

In an integrated circuit, it is often desirable to reduce unauthorised access to the contents of memory. This is particularly the case where the memory includes a key or some other form of security information that allows the integrated circuit to communicate with another entity (such as another integrated circuit, for example) in a secure manner. It would be particularly advantageous to prevent attacks involving direct probing of memory addresses by physically investigating the chip (as distinct from electronic or logical attacks via manipulation of signals and power supplied to the integrated circuit).

It is also desirable to provide an environment where the manufacturer of the integrated circuit (or some other authorised entity) can verify or authorize code to be run on an integrated circuit.

Another desideratum would be the ability of two or more entities, such as integrated circuits, to communicate with each other in a secure manner. It would also be desirable to provide a mechanism for secure communication between a first entity and a second entity, where the two entities, whilst capable of some form of secure communication, are not able to establish such communication between themselves.

In a system that uses resources (such as a printer, which uses inks) it may be desirable to monitor and update a record related to resource usage. Authenticating ink quality can be a major issue, since the attributes of inks used by a given printhead can be quite specific. Use of incorrect ink can result in anything from misfiring or poor performance to damage or destruction of the printhead. It would therefore be desirable to provide a system that enables authentication of the correct ink being used, as well as providing various support systems secure enabling refilling of ink cartridges.

In a system that prevents unauthorized programs from being loaded onto or run on an integrated circuit, it can be laborious to allow developers of software to access the circuits during software development. Enabling access to integrated circuits of a particular type requires authenticating software with a relatively high-level key. Distributing the key for use by developers is inherently unsafe, since a single leak of the key outside the organization could endanger security of all chips that use a related key to authorize programs. Having a small number of people with high-security clearance available to authenticate programs for testing can be inconvenient, particularly in the case where frequent incremental changes in programs during development require testing. It would be desirable to provide a mechanism for allowing access to one or more integrated circuits without risking the security of other integrated circuits in a series of such integrated circuits.

In symmetric key security, a message, denoted by M, is plaintext. The process of transforming M into ciphertext C, where the substance of M is hidden, is called encryption. The process of transforming C back into M is called decryption. Referring to the encryption function as E, and the decryption function as D, we have the following identities:

$$E[M]=C$$

$$D[C]=M$$

Therefore the following identity is true:

$$D[E[M]]=M$$

A symmetric encryption algorithm is one where:
the encryption function E relies on key $K_1$,
the decryption function D relies on key $K_2$,
$K_2$ can be derived from $K_1$, and
$K_1$ can be derived from $K_2$.

In most symmetric algorithms, $K_1$ equals $K_2$. However, even if $K_1$ does not equal $K_2$, given that one key can be derived from the other, a single key K can suffice for the mathematical definition. Thus:

$$E_K[M]=C$$

$$D_K[C]=M$$

The security of these algorithms rests very much in the key K. Knowledge of K allows anyone to encrypt or decrypt. Consequently K must remain a secret for the duration of the value of M. For example, M may be a wartime message "My current position is grid position 123-456". Once the war is over the value of M is greatly reduced, and if K is made public, the knowledge of the combat unit's position may be of no relevance whatsoever. The security of the particular symmetric algorithm is a function of two things: the strength of the algorithm and the length of the key.

An asymmetric encryption algorithm is one where:
the encryption function E relies on key $K_1$,
the decryption function D relies on key $K_2$,
$K_2$ cannot be derived from $K_1$ in a reasonable amount of time, and
$K_1$ cannot be derived from $K_2$ in a reasonable amount of time.
Thus:

$$E_{K1}[M]=C$$

$$D_{K2}[C]=M$$

These algorithms are also called public-key because one key $K_1$ can be made public. Thus anyone can encrypt a message (using $K_1$) but only the person with the corresponding decryption key ($K_2$) can decrypt and thus read the message.

In most cases, the following identity also holds:

$$E_{K2}[M]=C$$

$$D_{K1}[C]=M$$

This identity is very important because it implies that anyone with the public key $K_1$ can see M and know that it came from the owner of $K_2$. No-one else could have generated C because to do so would imply knowledge of $K_2$. This gives rise to a different application, unrelated to encryption—digital signatures.

A number of public key cryptographic algorithms exist. Most are impractical to implement, and many generate a very large C for a given M or require enormous keys. Still others, while secure, are far too slow to be practical for several years. Because of this, many public key systems are hybrid—a public key mechanism is used to transmit a symmetric session key, and then the session key is used for the actual messages.

All of the algorithms have a problem in terms of key selection. A random number is simply not secure enough. The two large primes p and q must be chosen carefully—there are certain weak combinations that can be factored more easily (some of the weak keys can be tested for). But nonetheless, key selection is not a simple matter of randomly selecting 1024 bits for example. Consequently the key selection process must also be secure.

Symmetric and asymmetric schemes both suffer from a difficulty in allowing establishment of multiple relationships between one entity and a two or more others, without the need to provide multiple sets of keys. For example, if a main entity wants to establish secure communications with two or more additional entities, it will need to maintain a different key for each of the additional entities. For practical reasons, it is desirable to avoid generating and storing large numbers of keys. To reduce key numbers, two or more of the entities may use the same key to communicate with the main entity. However, this means that the main entity cannot be sure which of the entities it is communicating with. Similarly, messages from the main entity to one of the entities can be decrypted by any of the other entities with the same key. It would be desirable if a mechanism could be provided to allow secure communication between a main entity and one or more other entities that overcomes at least some of the shortcomings of prior art.

In a system where a first entity is capable of secure communication of some form, it may be desirable to establish a relationship with another entity without providing the other entity with any information related the first entity's security features. Typically, the security features might include a key or a cryptographic function. It would be desirable to provide a mechanism for enabling secure communications between a first and second entity when they do not share the requisite secret function, key or other relationship to enable them to establish trust.

A number of other aspects, features, preferences and embodiments are disclosed in the Detailed Description of the Preferred Embodiment below.

SUMMARY OF THE INVENTION

In accordance with a first aspect of the invention, there is provided a method of preventing a first action associated with a first message from being performed in a target entity, the method including the steps of:

sending the first message to the target entity, the first message being configured to cause the entity to perform the first action and a second action; and sending a second message to the target entity, the second message being configured to cause the entity to perform a third action;

wherein the entity is configured such that performance of the second action and the third action is mutually incompatible.

In accordance with a second aspect of the invention, there is provided a method of attempting first write and a second write to first and second security fields in a target entity, the method including the steps of:

sending a first message to the target entity, the first message being configured to cause the entity to perform an action and to update the first and second security fields; and sending a second message to the target entity, the second message being configured to cause the entity to update the first and second security fields;

wherein the security fields have write restrictions associated with them such that updating the security fields in accordance with the first message prevents subsequent updating of the security fields in accordance with the second message, and wherein updating the security fields in accordance with the second message prevents subsequent updating of the security fields with the first message, and wherein the first action is only performed when updating of the security fields by the first message is successful.

In accordance with a third aspect of the invention, there is provided a method of performing a second attempted write to two security fields in a target entity to prevent subsequent application of an earlier attempted write to a data field, wherein:

each of the first and second security fields has a monotonically changeable write restriction associated with it; and the first attempted write included a first data value for the data field and first and second security values for the first and second security fields respectively;

the method including the step of sending a second write to the target entity, the second write including third and fourth security values for the first and second security fields respectively, wherein the write restrictions are such that application of the third and fourth security values to the first and second fields are mutually incompatible with application of the first and second security values to the first and second security fields, such that if any of the fields cannot be written to, none of them are written to.

Preferably, the write restrictions:

prevent the second write from being performed in the event that the first write was previously performed; and prevent the first write from subsequently being performed in the event that the second write is performed.

Preferably, the second write is sent in response to a notification that the first write was not successfully performed.

Preferably, the second write is sent in response to a notification that the first write was not received.

Preferably, the second write is sent after a predetermined time has elapsed after sending the first write without receiving confirmation of the first write being received or successfully performed.

Preferably, the method further includes the step of sending the second write a plurality of times until the second write is successfully received and/or performed.

Preferably, the method further includes the step of verifying the successful second write by performing an authenticated read of the first and second security fields.

Preferably, the method further includes updating a value related to the data field. Preferably, the write permissions are such that only decrementing or incrementing of the security fields are permitted.

More preferably, the write permissions are such that only decrementing of the security fields is permitted, and wherein:
the value in the first security field prior to the first attempted write was x;
the value in the second security field prior to the first attempted write was y;
the value of the first security data was x-a;
the value of the second security data was y-b;
the value of the third security data being x-c; and
the value of the fourth security data being y-d;
wherein a<b, d<c and a, b, c and d are >0.

It is particularly preferable that a=d and b=c, and even more preferable that a=d=1 and b=c=2.

Preferably, the target entity is a first integrated circuit and the messages are sent by a second integrated circuit.

BRIEF DESCRIPTION OF THE DRAWINGS

Preferred and other embodiments of the invention will now be described, by way of example only, with reference to the accompanying drawings, in which:

FIG. 12 shows permissions

FIG. 13 shows a first example of permissions for a field

FIG. 14 shows a second example of permissions for a field

FIG. 15 shows field attributes

DETAILED DESCRIPTION OF PREFERRED AND OTHER EMBODIMENTS

Figure 1:
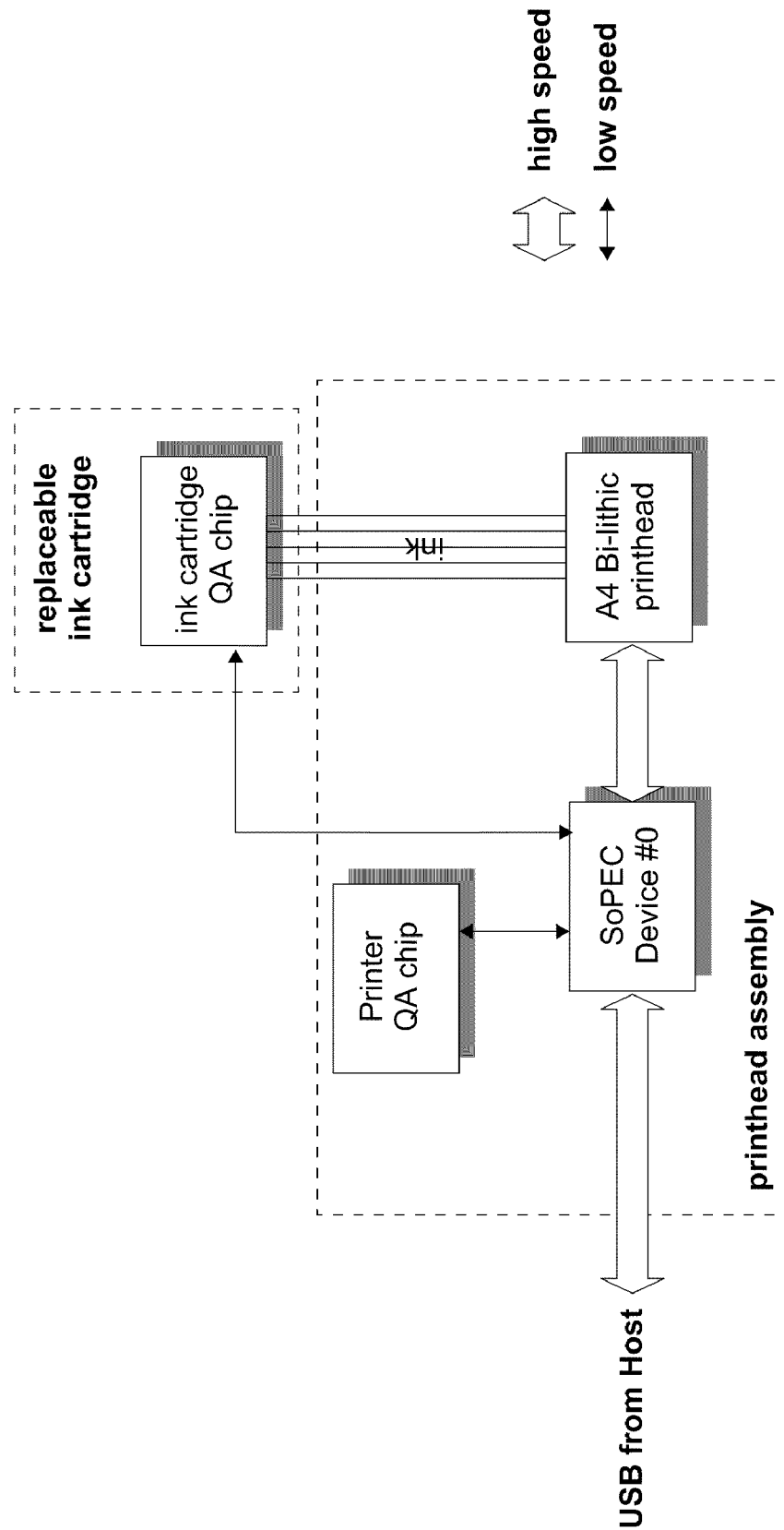
FIG. 1 is an example of a single printer controller (hereinafter "SoPEC") A4 simplex printer system

Indications of expected rates, frequencies, costs, and other quantitative values are exemplary and estimated only, and are made in good faith. Nothing in this specification should be read as implying that a particular commercial embodiment is or will be capable of a particular performance level in any measurable area.

It will be appreciated that the principles, methods and hardware described throughout this document can be applied to other fields. Much of the security-related disclosure, for example, can be applied to many other fields that require secure communications between entities, and certainly has application far beyond the field of printers.

The preferred embodiment of the present invention is implemented in a printer using microelectromechanical systems (MEMS) printheads. The printer can receive data from, for example, a personal computer such as an IBM compatible PC or Apple computer. In other embodiments, the printer can receive data directly from, for example, a digital still or video camera. The particular choice of communication link is not important, and can be based, for example, on USB, Firewire, Bluetooth or any other wireless or hardwired communications protocol.

This document describes the SoPEC (Small office home office Print Engine Controller) ASIC (Application Specific Integrated Circuit) suitable for use in, for example, SoHo printer products. The SoPEC ASIC is intended to be a low cost solution for bi-lithic printhead control, replacing the multichip solutions in larger more professional systems with a single chip. The increased cost competitiveness is achieved by integrating several systems such as a modified PEC1 printing pipeline, CPU control system, peripherals and memory sub-system onto one SoC ASIC, reducing component count and simplifying board design.

This section will give a general introduction to Memjet printing systems, introduce the components that make a bi-lithic printhead system, describe possible system architectures and show how several SoPECs can be used to achieve A3 and A4 duplex printing. The section "Error! Reference source not found." describes the SoC SoPEC ASIC, with subsections describing the CPU, DRAM and Print Engine Pipeline subsystems. Each section gives a detailed description of the blocks used and their operation within the overall print system. The final section describes the bi-lithic printhead construction and associated implications to the system due to its makeup.

A bi-lithic based printhead is constructed from 2 printhead ICs of varying sizes. The notation M:N is used to express the size relationship of each IC, where M specifies one printhead IC in inches and N specifies the remaining printhead IC in inches.

The 'SoPEC/MoPEC Bilithic Printhead Reference' document contains a description of the bi-lithic printhead and related terminology.

The following terms are used throughout this specification:

| | |
|---|---|
| Bi-lithic printhead | Refers to printhead constructed from 2 printhead ICs |
| CPU | Refers to CPU core, caching system and MMU. |
| ISI-Bridge chip | A device with a high speed interface (such as USB2.0, Ethernet or IEEE1394) and one or more ISI interfaces. The ISI-Bridge would be the ISIMaster for each of the ISI buses it interfaces to. |
| ISIMaster | The ISIMaster is the only device allowed to initiate communication on the Inter Sopec Interface (ISI) bus. The ISIMaster interfaces with the host. |
| ISISlave | Multi-SoPEC systems will contain one or more ISISlave SoPECs connected to the ISI bus. ISISlaves can only respond to communication initiated by the ISIMaster. |
| LEON | Refers to the LEON CPU core. |
| LineSyncMaster | The LineSyncMaster device generates the line synchronisation pulse that all SoPECs in the system must synchronise their line outputs to. |
| Multi-SoPEC | Refers to SoPEC based print system with multiple SoPEC devices |
| Netpage | Refers to page printed with tags (normally in infrared ink). |
| PEC1 | Refers to Print Engine Controller version 1, precursor to SoPEC used to control printheads constructed from multiple angled printhead segments. |

| | |
|---|---|
| Printhead IC | Single MEMS IC used to construct bi-lithic printhead |
| PrintMaster | The PrintMaster device is responsible for coordinating all aspects of the print operation. There may only be one PrintMaster in a system. |
| QA Chip | Quality Assurance Chip |
| Storage SoPEC | An ISIslave SoPEC used as a DRAM store and which does not print. |
| Tag | Refers to pattern which encodes information about its position and orientation hich allow it to be optically located and its data contents read. |

A bi-lithic printhead produces 1600 dpi bi-level dots. On low-diffusion paper, each ejected drop forms a 22.5 micrometer diameter dot. Dots are easily produced in isolation, allowing dispersed-dot dithering to be exploited to its fullest. Since the bi-lithic printhead is the width of the page and operates with a constant paper velocity, color planes are printed in perfect registration, allowing ideal dot-on-dot printing. Dot-on-dot printing minimizes 'muddying' of midtones caused by inter-color bleed.

A page layout may contain a mixture of images, graphics and text. Continuous-tone (contone) images and graphics are reproduced using a stochastic dispersed-dot dither. Unlike a clustered-dot (or amplitude-modulated) dither, a dispersed-dot (or frequency-modulated) dither reproduces high spatial frequencies (i.e. image detail) almost to the limits of the dot resolution, while simultaneously reproducing lower spatial frequencies to their full color depth, when spatially integrated by the eye. A stochastic dither matrix is carefully designed to be free of objectionable low-frequency patterns when tiled across the image. As such its size typically exceeds the minimum size required to support a particular number of intensity levels (e.g. 16×16×8 bits for 257 intensity levels).

Human contrast sensitivity peaks at a spatial frequency of about 3 cycles per degree of visual field and then falls off logarithmically, decreasing by a factor of 100 beyond about 40 cycles per degree and becoming immeasurable beyond 60 cycles per degree. At a normal viewing distance of 12 inches (about 300 mm), this translates roughly to 200-300 cycles per inch (cpi) on the printed page, or 400-600 samples per inch according to Nyquist's theorem. In practice, contone resolution above about 300 ppi is of limited utility outside special applications such as medical imaging. Offset printing of magazines, for example, uses contone resolutions in the range 150 to 300 ppi. Higher resolutions contribute slightly to color error through the dither.

Black text and graphics are reproduced directly using bi-level black dots, and are therefore not anti-aliased (i.e. low-pass filtered) before being printed. Text should therefore be supersampled beyond the perceptual limits discussed above, to produce smoother edges when spatially integrated by the eye. Text resolution up to about 1200 dpi continues to contribute to perceived text sharpness (assuming low-diffusion paper, of course).

A Netpage printer, for example, may use a contone resolution of 267 ppi (i.e. 1600 dpi 6), and a black text and graphics resolution of 800 dpi. A high end office or departmental printer may use a contone resolution of 320 ppi (1600 dpi/5) and a black text and graphics resolution of 1600 dpi. Both formats are capable of exceeding the quality of commercial (offset) printing and photographic reproduction.

The SoPEC device can be used in several printer configurations and architectures.

In the general sense every SoPEC based printer architecture will contain:
  One or more SoPEC devices.
  One or more bi-lithic printheads.
  Two or more LSS busses.
  Two or more QA chips.
  USB 1.1 connection to host or ISI connection to Bridge Chip.
  ISI bus connection between SoPECs (when multiple SoPECs are used).

The SoPEC device contains several system on a chip (SoC) components, as well as the print engine pipeline control application specific logic.

The PEP reads compressed page store data from the embedded memory, optionally decompresses the data and formats it for sending to the printhead. The print engine pipeline functionality includes expanding the page image, dithering the contone layer, compositing the black layer over the contone layer, rendering of Netpage tags, compensation for dead nozzles in the printhead, and sending the resultant image to the bi-lithic printhead.

SoPEC contains an embedded CPU for general purpose system configuration and management. The CPU performs page and band header processing, motor control and sensor monitoring (via the GPIO) and other system control functions. The CPU can perform buffer management or report buffer status to the host. The CPU can optionally run vendor application specific code for general print control such as paper ready monitoring and LED status update.

A 2.5 Mbyte embedded memory buffer is integrated onto the SoPEC device, of which approximately 2 Mbytes are available for compressed page store data. A compressed page is divided into one or more bands, with a number of bands stored in memory. As a band of the page is consumed by the PEP for printing a new band can be downloaded. The new band may be for the current page or the next page.

Using banding it is possible to begin printing a page before the complete compressed page is downloaded, but care must be taken to ensure that data is always available for printing or a buffer underrun may occur.

An Storage SoPEC acting as a memory buffer or an ISI-Bridge chip with attached DRAM could be used to provide guaranteed data delivery.

The embedded USB 1.1 device accepts compressed page data and control commands from the host PC, and facilitates the data transfer to either embedded memory or to another SoPEC device in multi-SoPEC systems.

The printhead is constructed by abutting 2 printhead ICs together. The printhead ICs can vary in size from 2 inches to 8 inches, so to produce an A4 printhead several combinations are possible. For example two printhead ICs of 7 inches and 3 inches could be used to create a A4 printhead (the notation is 7:3). Similarly 6 and 4 combination (6:4), or 5:5 combination. For an A3 printhead it can be constructed from 8:6 or an 7:7 printhead IC combination. For photographic printing smaller printheads can be constructed.

Each SoPEC device has 2 LSS system buses for communication with QA devices for system authentication and ink usage accounting. The number of QA devices per bus and their position in the system is unrestricted with the exception that PRINTER_QA and INK_QA devices should be on separate LSS busses.

Each SoPEC system can have several QA devices. Normally each printing SoPEC will have an associated PRINTER_QA. Ink cartridges will contain an INK_QA chip. PRINTER_QA and INK_QA devices should be on separate LSS busses. All QA chips in the system are physically identical with flash memory contents defining PRINTER_QA from INK_QA chip.

The Inter-SoPEC Interface (ISI) provides a communication channel between SoPECs in a multi-SoPEC system. The ISIMaster can be SoPEC device or an ISI-Bridge chip depending on the printer configuration. Both compressed data and control commands are transferred via the interface.

A device, other than a SoPEC with a USB connection, which provides print data to a number of slave SoPECs. A bridge chip will typically have a high bandwidth connection, such as USB2.0, Ethernet or IEEE1394, to a host and may have an attached external DRAM for compressed page storage. A bridge chip would have one or more ISI interfaces. The use of multiple ISI buses would allow the construction of independent print systems within the one printer. The ISI-Bridge would be the ISIMaster for each of the ISI buses it interfaces to.

Several possible SoPEC based system architectures exist. The following sections outline some possible architectures. It is possible to have extra SoPEC devices in the system used for DRAM storage. The QA chip configurations shown are indicative of the flexibility of LSS bus architecture, but not limited to those configurations.

In FIG. 1, a single SoPEC device can be used to control two printhead ICs. The SoPEC receives compressed data through the USB device from the host. The compressed data is processed and transferred to the printhead.

Figure 2:
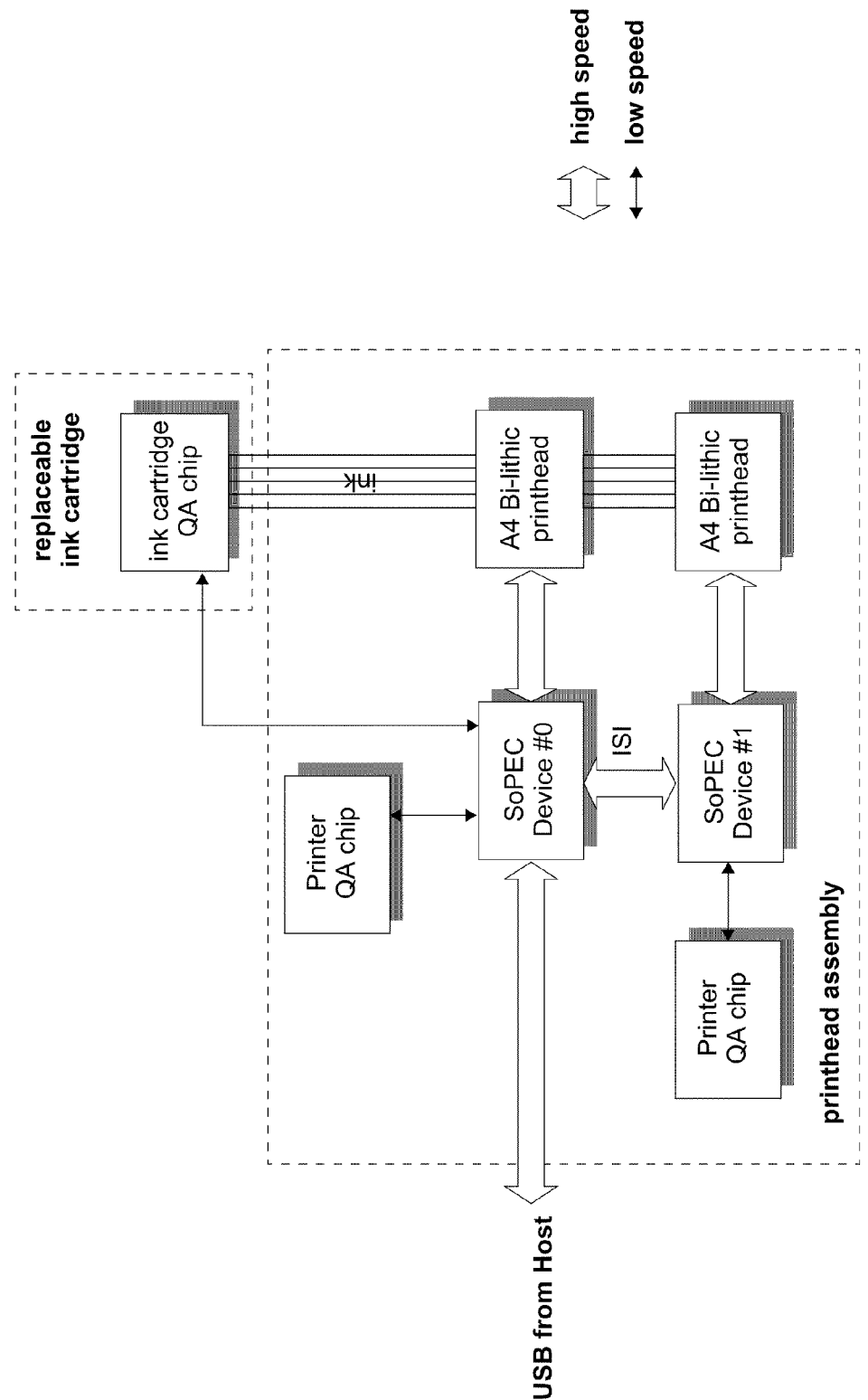
FIG. 2 is an example of a dual SoPEC A4 duplex printer system

In FIG. 2, two SoPEC devices are used to control two bi-lithic printheads, each with two printhead ICs. Each bi-lithic printhead prints to opposite sides of the same page to achieve duplex printing. The SoPEC connected to the USB is the ISIMaster SoPEC, the remaining SoPEC is an ISISlave. The ISIMaster receives all the compressed page data for both SoPECs and re-distributes the compressed data over the Inter-SoPEC Interface (ISI) bus.

It may not be possible to print an A4 page every 2 seconds in this configuration since the USB 1.1 connection to the host may not have enough bandwidth. An alternative would be for each SoPEC to have its own USB 1.1 connection. This would allow a faster average print speed.

Figure 3:
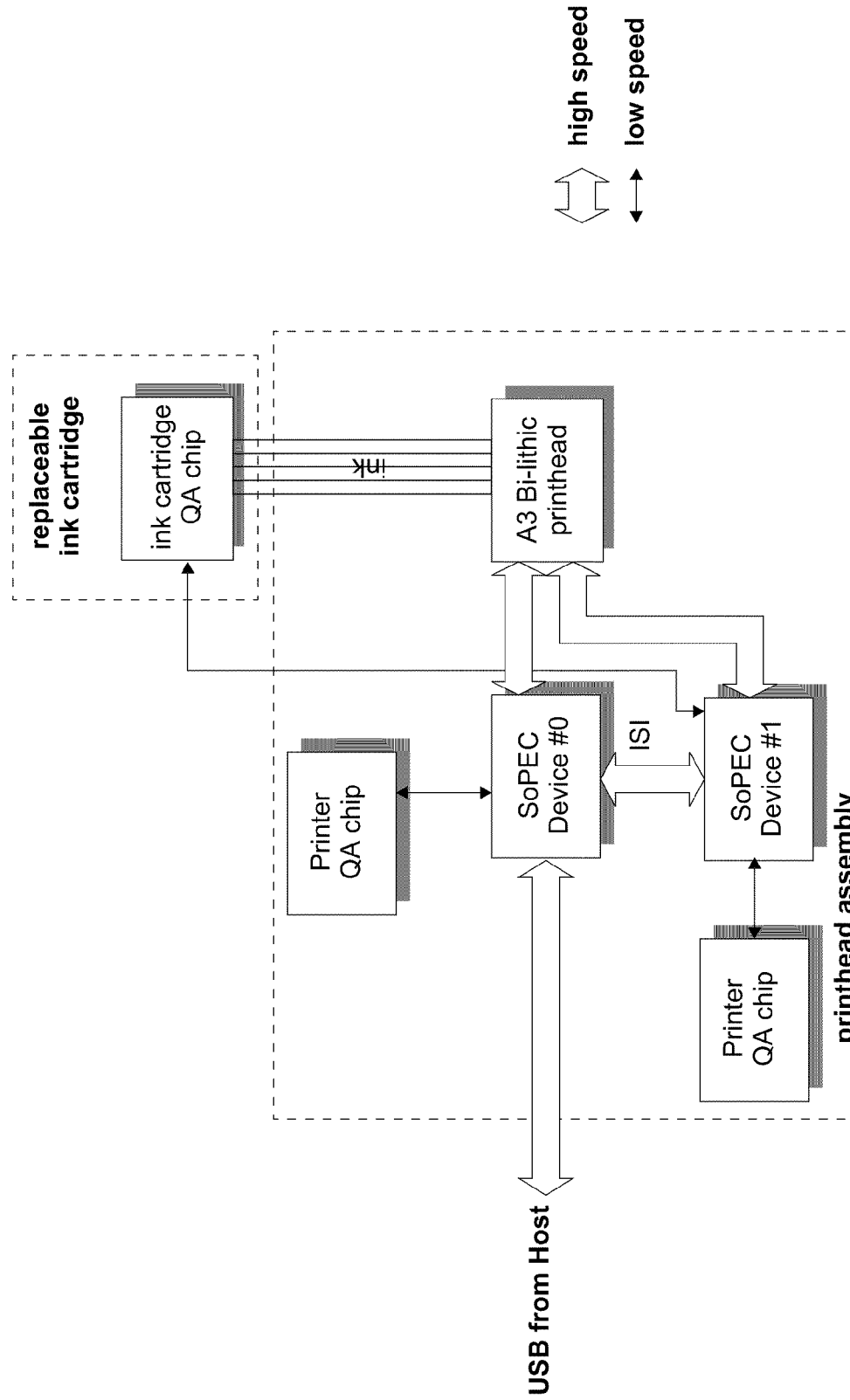
FIG. 3 is an example of a dual SoPEC A3 simplex printer system

In FIG. 3, two SoPEC devices are used to control one A3 bi-lithic printhead. Each SoPEC controls only one printhead IC (the remaining PHI port typically remains idle). This system uses the SoPEC with the USB connection as the ISIMaster. In this dual SoPEC configuration the compressed page store data is split across 2 SoPECs giving a total of 4 Mbyte page store, this allows the system to use compression rates as in an A4 architecture, but with the increased page size of A3. The ISIMaster receives all the compressed page data for all SoPECs and re-distributes the compressed data over the Inter-SoPEC Interface (ISI) bus.

It may not be possible to print an A3 page every 2 seconds in this configuration since the USB 1.1 connection to the host will only have enough bandwidth to supply 2 Mbytes every 2 seconds. Pages which require more than 2 MBytes every 2 seconds will therefore print more slowly. An alternative would be for each SoPEC to have its own USB 1.1 connection. This would allow a faster average print speed.

Figure 4:
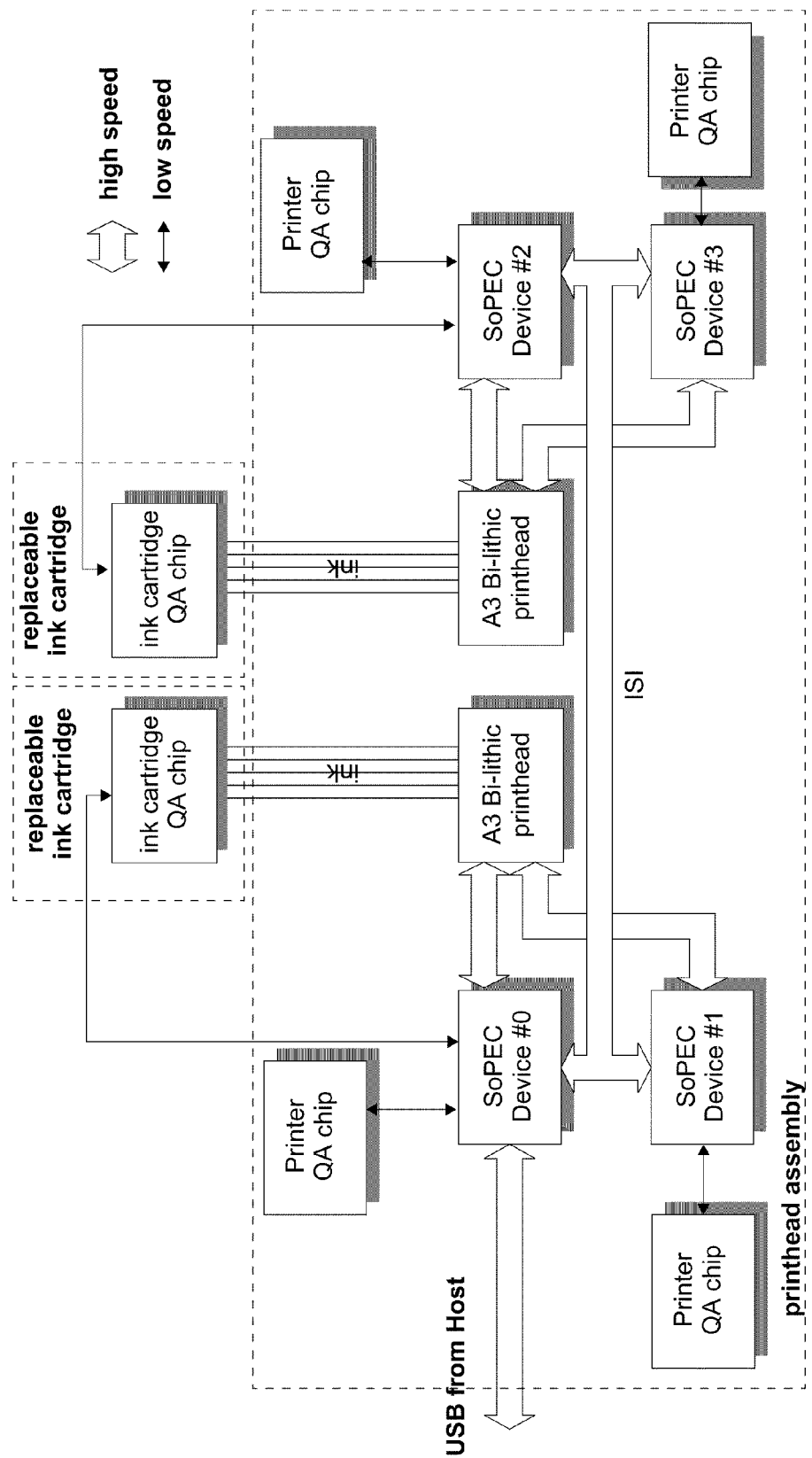
FIG. 4 is an example of a quad SoPEC A3 duplex printer system

In FIG. 4 a 4 SoPEC system is shown. It contains 2 A3 bi-lithic printheads, one for each side of an A3 page. Each printhead contain 2 printhead ICs, each printhead IC is controlled by an independent SoPEC device, with the remaining PHI port typically unused. Again the SoPEC with USB 1.1 connection is the ISIMaster with the other SoPECs as ISISlaves. In total, the system contains 8 Mbytes of compressed page store (2 Mbytes per SoPEC), so the increased page size does not degrade the system print quality, from that of an A4 simplex printer. The ISIMaster receives all the compressed page data for all SoPECs and re-distributes the compressed data over the Inter-SoPEC Interface (ISI) bus.

It may not be possible to print an A3 page every 2 seconds in this configuration since the USB 1.1 connection to the host will only have enough bandwidth to supply 2 Mbytes every 2 seconds. Pages which require more than 2 MBytes every 2 seconds will therefore print more slowly. An alternative would be for each SoPEC or set of SoPECs on the same side of the page to have their own USB 1.1 connection (as ISISlaves may also have direct USB connections to the host). This would allow a faster average print speed.

Figure 5:
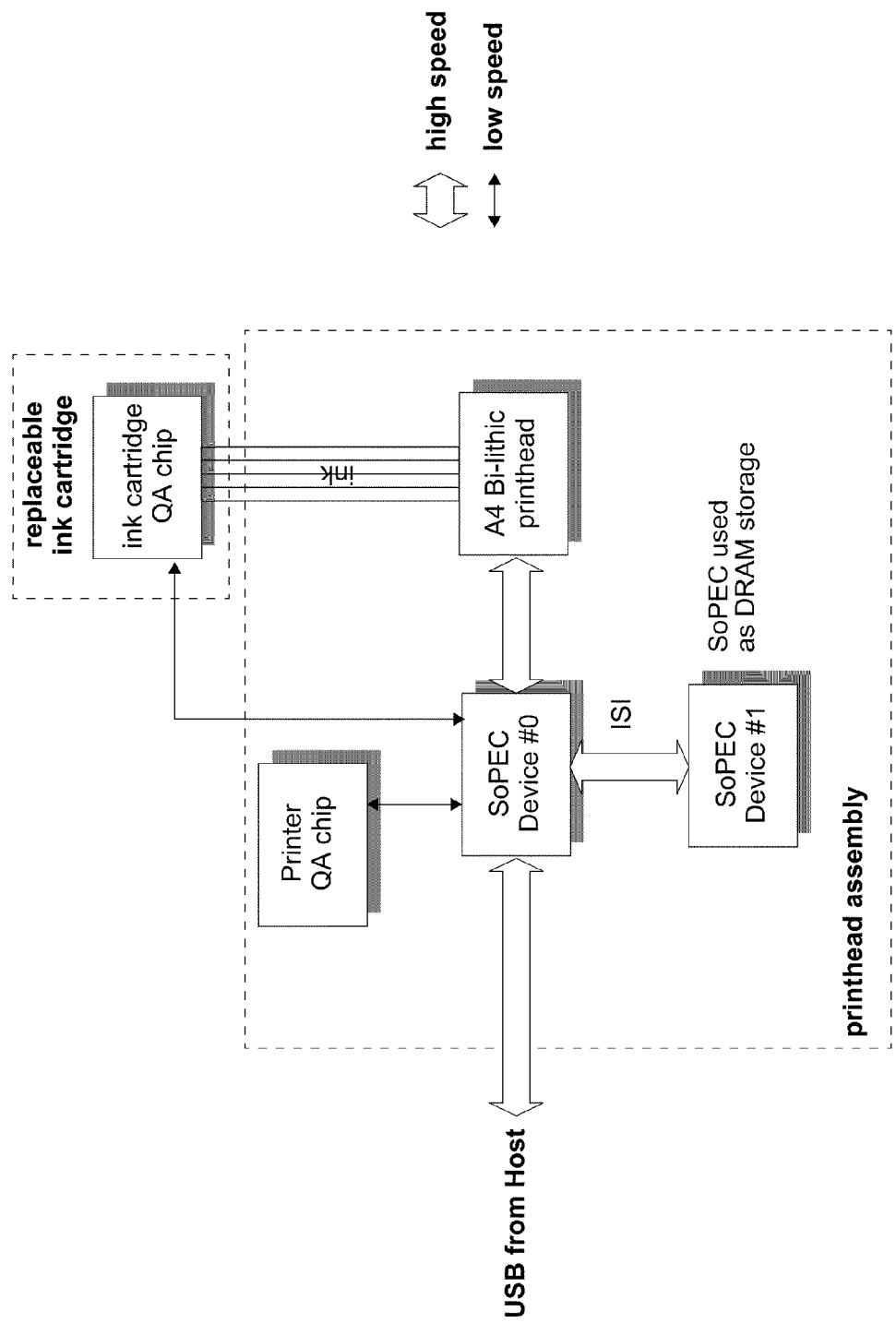
FIG. 5 is an example of a SoPEC A4 simplex printing system with an extra SoPEC used as DRAM storage

Extra SoPECs can be used for DRAM storage e.g. in FIG. 5 an A4 simplex printer can be built with a single extra SoPEC used for DRAM storage. The DRAM SoPEC can provide guaranteed bandwidth delivery of data to the printing SoPEC. SoPEC configurations can have multiple extra SoPECs used for DRAM storage.

Figure 6:
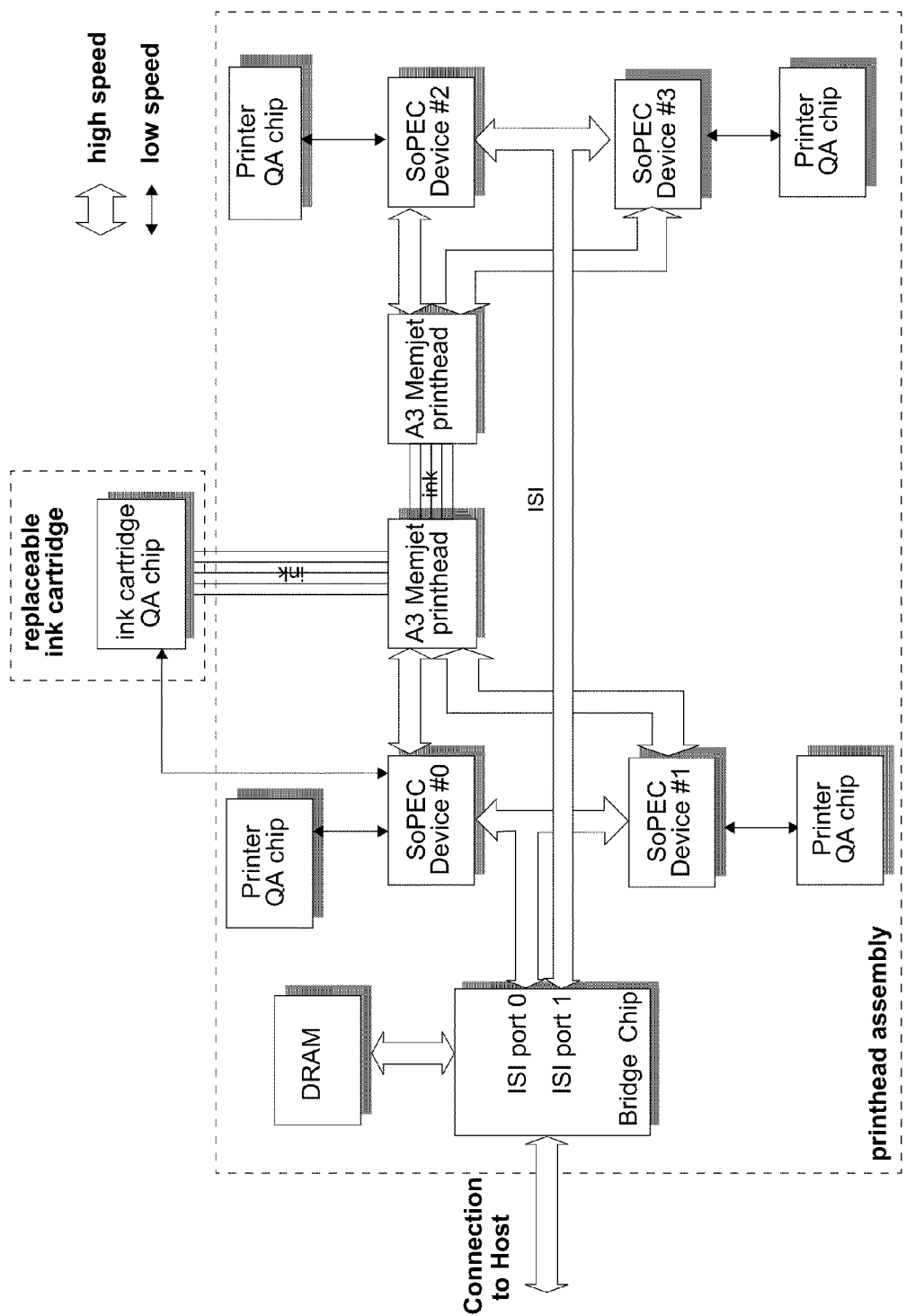
FIG. 6 is an example of an A3 duplex printing system featuring four printing SoPECs

In FIG. 6, an ISI-Bridge chip provides slave-only ISI connections to SoPEC devices. FIG. 6 shows a ISI-Bridge chip with 2 separate ISI ports. The ISI-Bridge chip is the ISIMaster on each of the ISI busses it is connected to. All connected SoPECs are ISISlaves. The ISI-Bridge chip will typically have a high bandwidth connection to a host and may have an attached external DRAM for compressed page storage.

An alternative to having a ISI-Bridge chip would be for each SoPEC or each set of SoPECs on the same side of a page to have their own USB 1.1 connection. This would allow a faster average print speed.

The SoPEC is a page rendering engine ASIC that takes compressed page images as input, and produces decompressed page images at up to 6 channels of bi-level dot data as output. The bi-level dot data is generated for the Memjet bi-lithic printhead. The dot generation process takes account of printhead construction, dead nozzles, and allows for fixative generation.

A single SoPEC can control 2 bi-lithic printheads and up to 6 color channels at 10,000 lines/sec[1], equating to 30 pages per minute. A single SoPEC can perform full-bleed printing of A3, A4 and Letter pages. The 6 channels of colored ink are the expected maximum in a consumer SOHO, or office Bi-lithic printing environment:

[1]10,000 lines per second equates to 30 A4/Letter pages per minute at 1600 dpi

CMY, for regular color printing.

K, for black text, line graphics and gray-scale printing.

IR (infrared), for Netpage-enabled applications.

F (fixative), to enable printing at high speed. Because the bi-lithic printer is capable of printing so fast, a fixative may be required to enable the ink to dry before the page touches the page already printed. Otherwise the pages may bleed on each other. In low speed printing environments the fixative may not be required.

SoPEC is color space agnostic. Although it can accept contone data as CMYX or RGBX, where X is an optional 4th channel, it also can accept contone data in any print color space. Additionally, SoPEC provides a mechanism for arbitrary mapping of input channels to output channels, including combining dots for ink optimization, generation of channels based on any number of other channels etc. However, inputs are typically CMYK for contone input, K for the bi-level input, and the optional Netpage tag dots are typically rendered to an infra-red layer. A fixative channel is typically generated for fast printing applications.

SoPEC is resolution agnostic. It merely provides a mapping between input resolutions and output resolutions by means of scale factors. The expected output resolution is 1600 dpi, but SoPEC actually has no knowledge of the physical resolution of the Bi-lithic printhead. SoPEC is page-length agnostic. Successive pages are typically split into bands and downloaded into the page store as each band of information is consumed and becomes free. SoPEC provides an interface for synchronization with other SoPECs. This allows simple multi-SoPEC solutions for simultaneous A3/A4/Letter duplex printing. However, SoPEC is also capable of printing only a portion of a page image. Combining synchronization functionality with partial page rendering allows multiple SoPECs to be readily combined for alternative printing requirements including simultaneous duplex printing and wide format printing.

Table 1 lists some of the features and corresponding benefits of SoPEC.

The required printing rate for SoPEC is 30 sheets per minute with an inter-sheet spacing of 4 cm. To achieve a 30 sheets per minute print rate, this requires:

300 mm×63 (dot/mm)/2 sec=105.8 seconds per line, with no inter-sheet gap.

340 mm×63 (dot/mm)/2 sec=93.3 seconds per line, with a 4 cm inter-sheet gap.

A printline for an A4 page consists of 13824 nozzles across the page. At a system clock rate of 160 MHz 13824 dots of data can be generated in 86.4 seconds. Therefore data can be generated fast enough to meet the printing speed requirement. It is necessary to deliver this print data to the print-heads.

Printheads can be made up of 5:5, 6:4, 7:3 and 8:2 inch printhead combinations. Print data is transferred to both print heads in a pair simultaneously. This means the longest time to print a line is determined by the time to transfer print data to

TABLE 1

Features and Benefits of SoPEC

| Feature | Benefits |
|---|---|
| Optimised print architecture in hardware | 30 ppm full page photographic quality color printing from a desktop PC |
| 0.13 micron CMOS (>3 million transistors) | High speed<br>Low cost<br>High functionality |
| 900 Million dots per second | Extremely fast page generation |
| 10,000 lines per second at 1600 dpi | 0.5 A4/Letter pages per SoPEC chip per second |
| 1 chip drives up to 133,920 nozzles | Low cost page-width printers |
| 1 chip drives up to 6 color planes | 99% of SoHo printers can use 1 SoPEC device |
| Integrated DRAM | No external memory required, leading to low cost systems |
| Power saving sleep mode | SoPEC can enter a power saving sleep mode to reduce power dissipation between print jobs |
| JPEG expansion | Low bandwidth from PC<br>Low memory requirements in printer |
| Lossless bitplane expansion | High resolution text and line art with low bandwidth from PC (e.g. over USB) |
| Netpage tag expansion | Generates interactive paper |
| Stochastic dispersed dot dither | Optically smooth image quality<br>No moire effects |
| Hardware compositor for 6 image planes | Pages composited in real-time |
| Dead nozzle compensation | Extends printhead life and yield<br>Reduces printhead cost |
| Color space agnostic | Compatible with all inksets and image sources including RGB, CMYK, spot, CIE L*a*b*, hexachrome, YCrCbK, sRGB and other |
| Color space conversion | Higher quality/lower bandwidth |
| Computer interface | USB1.1 interface to host and ISI interface to ISI-Bridge chip thereby allowing connection to IEEE 1394, Bluetooth etc. |
| Cascadable in resolution | Printers of any resolution |
| Cascadable in color depth | Special color sets e.g. hexachrome can be used |
| Cascadable in image size | Printers of any width up to 16 inches |
| Cascadable in pages | Printers can print both sides simultaneously |
| Cascadable in speed | Higher speeds are possible by having each SoPEC print one vertical strip of the page. |
| Fixative channel data generation | Extremely fast ink drying without wastage |
| Built-in security | Revenue models are protected |
| Undercolor removal on dot-by-dot basis | Reduced ink usage |
| Does not require fonts for high speed operation | No font substitution or missing fonts |
| Flexible printhead configuration | Many configurations of printheads are supported by one chip type |
| Drives Bi-lithic printheads directly | No print driver chips required, results in lower cost |
| Determines dot accurate ink usage | Removes need for physical ink monitoring system in ink cartridges | the longest print segment. There are 9744 nozzles across a 7 inch printhead. The print data is transferred to the printhead at a rate of 106 MHz (⅔ of the system clock rate) per color plane. This means that it will take 91.9 s to transfer a single line for a 7:3 printhead configuration. So we can meet the requirement of 30 sheets per minute printing with a 4 cm gap with a 7:3 printhead combination. There are 11160 across an 8 inch printhead. To transfer the data to the printhead at 106 MHz will take 105.3 s. So an 8:2 printhead combination printing with an inter-sheet gap will print slower than 30 sheets per minute.

Figure 7:
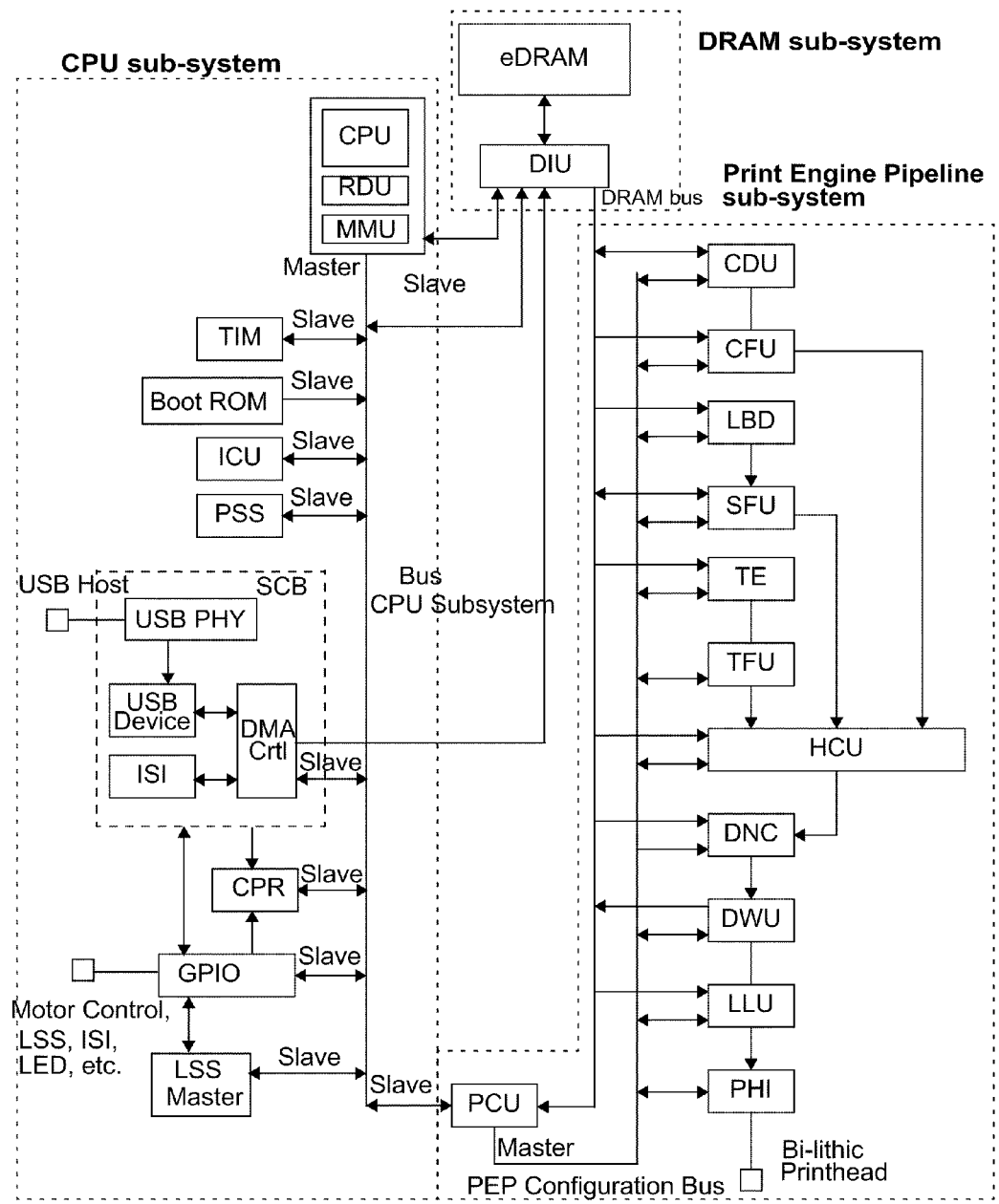
FIG. 7 shows a SoPEC system top level partition

From the highest point of view the SoPEC device consists of 3 distinct subsystems
CPU Subsystem
DRAM Subsystem
Print Engine Pipeline (PEP) Subsystem
See FIG. 7 for a block level diagram of SoPEC.

The CPU subsystem controls and configures all aspects of the other subsystems. It provides general support for interfacing and synchronising the external printer with the internal print engine. It also controls the low speed communication to the QA chips. The CPU subsystem contains various peripherals to aid the CPU, such as GPIO (includes motor control), interrupt controller, LSS Master and general timers. The Serial Communications Block (SCB) on the CPU subsystem provides a full speed USB1.1 interface to the host as well as an Inter SoPEC Interface (ISI) to other SoPEC devices.

The DRAM subsystem accepts requests from the CPU, Serial Communications Block (SCB) and blocks within the PEP subsystem. The DRAM subsystem (in particular the DIU) arbitrates the various requests and determines which request should win access to the DRAM. The DIU arbitrates based on configured parameters, to allow sufficient access to DRAM for all requestors. The DIU also hides the implementation specifics of the DRAM such as page size, number of banks, refresh rates etc.

The Print Engine Pipeline (PEP) subsystem accepts compressed pages from DRAM and renders them to bi-level dots for a given print line destined for a printhead interface that communicates directly with up to 2 segments of a bi-lithic printhead. The first stage of the page expansion pipeline is the CDU, LBD and TE. The CDU expands the JPEG-compressed contone (typically CMYK) layer, the LBD expands the compressed bi-level layer (typically K), and the TE encodes Netpage tags for later rendering (typically in IR or K ink). The output from the first stage is a set of buffers: the CFU, SFU, and TFU. The CFU and SFU buffers are implemented in DRAM.

The second stage is the HCU, which dithers the contone layer, and composites position tags and the bi-level spot0 layer over the resulting bi-level dithered layer. A number of options exist for the way in which compositing occurs. Up to 6 channels of bi-level data are produced from this stage. Note that not all 6 channels may be present on the printhead. For example, the printhead may be CMY only, with K pushed into the CMY channels and IR ignored. Alternatively, the position tags may be printed in K if IR ink is not available (or for testing purposes).

The third stage (DNC) compensates for dead nozzles in the printhead by color redundancy and error diffusing dead nozzle data into surrounding dots.

The resultant bi-level 6 channel dot-data (typically CMYK-IRF) is buffered and written out to a set of line buffers stored in DRAM via the DWU.

Finally, the dot-data is loaded back from DRAM, and passed to the printhead interface via a dot FIFO. The dot FIFO accepts data from the LLU at the system clock rate (pclk), while the PHI removes data from the FIFO and sends it to the printhead at a rate of ⅔ times the system clock rate.

Looking at FIG. 7, the various units are described here in summary form:

TABLE 2

Units within SoPEC

| Subsystem | Unit Acronym | Unit Name | Description |
|---|---|---|---|
| DRAM | DIU | DRAM interface unit | Provides the interface for DRAM read and write access for the various SoPEC units, CPU and the SCB block. The DIU provides arbitration between competing units controls DRAM access. |
| | DRAM | Embedded DRAM | 20 Mbits of embedded DRAM, |
| CPU | CPU | Central Processing Unit | CPU for system configuration and control |
| | MMU | Memory Management Unit | Limits access to certain memory address areas in CPU user mode |
| | RDU | Real-time Debug Unit | Facilitates the observation of the contents of most of the CPU addressable registers in SoPEC in addition to some pseudo-registers in realtime. |
| | TIM | General Timer | Contains watchdog and general system timers |
| | LSS | Low Speed Serial Interfaces | Low level controller for interfacing with the QA chips |
| | GPIO | General Purpose IOs | General IO controller, with built-in Motor control unit, LED pulse units and de-glitch circuitry |
| | ROM | Boot ROM | 16 KBytes of System Boot ROM code |
| | ICU | Interrupt Controller Unit | General Purpose interrupt controller with configurable priority, and masking. |
| | CPR | Clock, Power and Reset block | Central Unit for controlling and generating the system clocks and resets and powerdown mechanisms |
| | PSS | Power Save Storage | Storage retained while system is powered down |

TABLE 2-continued

Units within SoPEC

| Subsystem | Unit Acronym | Unit Name | Description |
|---|---|---|---|
| | USB | Universal Serial Bus Device | USB device controller for interfacing with the host USB. |
| | ISI | Inter-SoPEC Interface | ISI controller for data and control communication with other SoPEC's in a multi-SoPEC system |
| | SCB | Serial Communication Block | Contains both the USB and ISI blocks. |
| Print Engine Pipeline (PEP) | PCU | PEP controller | Provides external CPU with the means to read and write PEP Unit registers, and read and write DRAM in single 32-bit chunks. |
| | CDU | Contone decoder unit | Expands JPEG compressed contone layer and writes decompressed contone to DRAM |
| | CFU | Contone FIFO Unit | Provides line buffering between CDU and HCU |
| | LBD | Lossless Bi-level Decoder | Expands compressed bi-level layer. |
| | SFU | Spot FIFO Unit | Provides line buffering between LBD and HCU |
| | TE | Tag encoder | Encodes tag data into line of tag dots. |
| | TFU | Tag FIFO Unit | Provides tag data storage between TE and HCU |
| | HCU | Halftoner compositor unit | Dithers contone layer and composites the bi-level spot 0 and position tag dots. |
| | DNC | Dead Nozzle Compensator | Compensates for dead nozzles by color redundancy and error diffusing dead nozzle data into surrounding dots. |
| | DWU | Dotline Writer Unit | Writes out the 6 channels of dot data for a given printline to the line store DRAM |
| | LLU | Line Loader Unit | Reads the expanded page image from line store, formatting the data appropriately for the bi-lithic printhead. |
| | PHI | PrintHead Interface | Is responsible for sending dot data to the bi-lithic printheads and for providing line synchronization between multiple SoPECs. Also provides test interface to printhead such as temperature monitoring and Dead Nozzle Identification. |

SoPEC must address
20 Mbit DRAM.
PCU addressed registers in PEP.
CPU-subsystem addressed registers.

SoPEC has a unified address space with the CPU capable of addressing all CPU-subsystem and PCU-bus accessible registers (in PEP) and all locations in DRAM. The CPU generates byte-aligned addresses for the whole of SoPEC.

22 bits are sufficient to byte address the whole SoPEC address space.

The embedded DRAM is composed of 256-bit words. However the CPU-subsystem may need to write individual bytes of DRAM. Therefore it was decided to make the DIU byte addressable. 22 bits are required to byte address 20 Mbits of DRAM.

Most blocks read or write 256-bit words of DRAM. Therefore only the top 17 bits i.e. bits 21 to 5 are required to address 256-bit word aligned locations.

The exceptions are
CDU which can write 64-bits so only the top 19 address bits i.e. bits 21-3 are required.
The CPU-subsystem always generates a 22-bit byte-aligned DIU address but it will send flags to the DIU indicating whether it is an 8, 16 or 32-bit write.

All DIU accesses must be within the same 256-bit aligned DRAM word.

PEP Unit configuration registers which specify DRAM locations should specify 256-bit aligned DRAM addresses i.e. using address bits 21:5. Legacy blocks from PEC1 e.g. the LBD and TE may need to specify 64-bit aligned DRAM addresses if these reused blocks DRAM addressing is difficult to modify. These 64-bit aligned addresses require address bits 21:3. However, these 64-bit aligned addresses should be programmed to start at a 256-bit DRAM word boundary.

Unlike PEC1, there are no constraints in SoPEC on data organization in DRAM except that all data structures must start on a 256-bit DRAM boundary. If data stored is not a multiple of 256-bits then the last word should be padded.

The CPU subsystem bus supports 32-bit word aligned read and write accesses with variable access timings. The CPU subsystem bus does not currently support byte reads and writes but this can be added at a later date if required by imported IP.

The PCU only supports 32-bit register reads and writes for the PEP blocks. As the PEP blocks only occupy a subsection of the overall address map and the PCU is explicitly selected by the MMU when a PEP block is being accessed the PCU does not need to perform a decode of the higher-order address bits. See Table 4 for the PEP subsystem address map.

Figure 8:
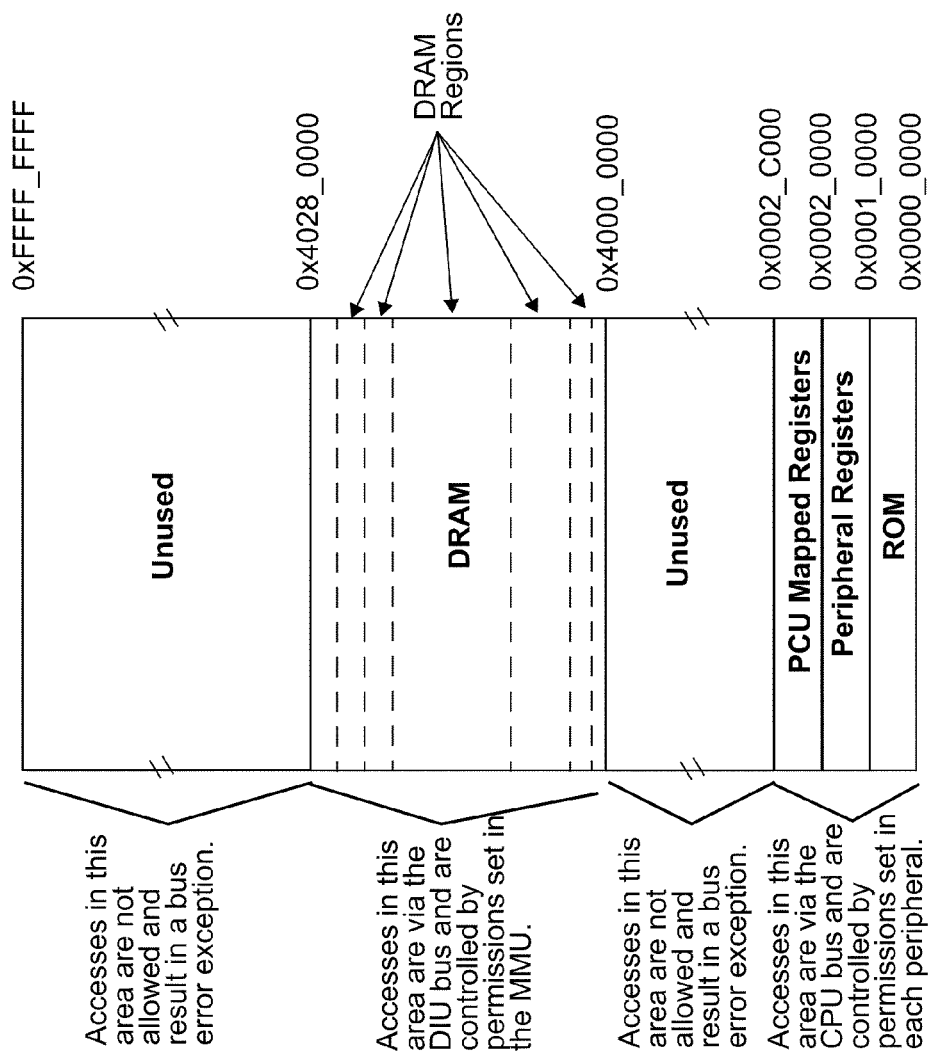
FIG. 8 shows a SoPEC CPU memory map (not to scale)

The system wide memory map is shown in FIG. 8.

The address mapping for the peripherals attached to the CPU-bus is shown in Table 3 below. The MMU performs the decode of cpu_adr[21:12] to generate the relevant cpu_block_select signal for each block. The addressed blocks decode however many of the lower order bits of cpu_adr[11:2] are required to address all the registers within the block.

TABLE 3

CPU-bus peripherals address map

| Block_base | Address |
| --- | --- |
| ROM_base | 0x0000_0000 |
| MMU_base | 0x0001_0000 |
| TIM_base | 0x0001_1000 |
| LSS_base | 0x0001_2000 |
| GPIO_base | 0x0001_3000 |
| SCB_base | 0x0001_4000 |
| ICU_base | 0x0001_5000 |
| CPR_base | 0x0001_6000 |
| DIU_base | 0x0001_7000 |
| PSS_base | 0x0001_8000 |
| Reserved | 0x0001_9000 to 0x0001_FFFF |
| PCU_base | 0x0002_0000 to 0x0002_BFFF |

The PEP blocks are addressed via the PCU. From FIG. 8, the PCU mapped registers are in the range 0x0002_0000 to 0x0002_BFFF. From Table 4 it can be seen that there are 12 sub-blocks within the PCU address space. Therefore, only four bits are necessary to address each of the sub-blocks within the PEP part of SoPEC. A further 12 bits may be used to address any configurable register within a PEP block. This gives scope for 1024 configurable registers per sub-block (the PCU mapped registers are all 32-bit addressed registers so the upper 10 bits are required to individually address them). This address will come either from the CPU or from a command stored in DRAM. The bus is assembled as follows:

address[15:12]=sub-block address,
address[n:2]=register address within sub-block, only the number of bits required to decode the registers within each sub-block are used,
address[1:0]=byte address, unused as PCU mapped registers are all 32-bit addressed registers.

So for the case of the HCU, its addresses range from 0x7000 to 0x7_FFF within the PEP subsystem or from 0x0002_7000 to 0x0002_7FFF in the overall system.

TABLE 4

PEP blocks address map

| Block_base | Address |
| --- | --- |
| PCU_base | 0x0002_0000 |
| CDU_base | 0x0002_1000 |
| CFU_base | 0x0002_2000 |
| LBD_base | 0x0002_3000 |
| SFU_base | 0x0002_4000 |
| TE_base | 0x0002_5000 |
| TFU_base | 0x0002_6000 |
| HCU_base | 0x0002_7000 |
| DNC_base | 0x0002_8000 |
| DWU_base | 0x0002_9000 |
| LLU_base | 0x0002_A000 |
| PHI_base | 0x0002_B000 to 0x0002_BFFF |

SoPEC has a requirement to print 1 side every 2 seconds i.e. 30 sides per minute. Approximately 2 Mbytes of DRAM are reserved for compressed page buffering in SoPEC. If a page is compressed to fit within 2 Mbyte then a complete page can be transferred to DRAM before printing. However, the time to transfer 2 Mbyte using USB 1.1 is approximately 2 seconds. The worst case cycle time to print a page then approaches 4 seconds. This reduces the worst-case print speed to 15 pages per minute.

The SoPEC page-expansion blocks support the notion of page banding. The page can be divided into bands and another band can be sent down to SoPEC while we are printing the current band.

Therefore we can start printing once at least one band has been downloaded.

The band size granularity should be carefully chosen to allow efficient use of the USB bandwidth and DRAM buffer space. It should be small enough to allow seamless 30 sides per minute printing but not so small as to introduce excessive CPU overhead in orchestrating the data transfer and parsing the band headers. Band-finish interrupts have been provided to notify the CPU of free buffer space. It is likely that the host PC will supervise the band transfer and buffer management instead of the SoPEC CPU.

If SoPEC starts printing before the complete page has been transferred to memory there is a risk of a buffer underrun occurring if subsequent bands are not transferred to SoPEC in time e.g. due to insufficient USB bandwidth caused by another USB peripheral consuming USB bandwidth. A buffer underrun occurs if a line synchronisation pulse is received before a line of data has been transferred to the printhead and causes the print job to fail at that line. If there is no risk of buffer underrun then printing can safely start once at least one band has been downloaded.

If there is a risk of a buffer underrun occurring due to an interruption of compressed page data transfer, then the safest approach is to only start printing once we have loaded up the data for a complete page. This means that a worst case latency in the region of 2 seconds (with USB 1.1) will be incurred before printing the first page. Subsequent pages will take 2 seconds to print giving us the required sustained printing rate of 30 sides per minute.

A Storage SoPEC could be added to the system to provide guaranteed bandwidth data delivery. The print system could also be constructed using an ISI-Bridge chip to provide guaranteed data delivery.

The most efficient page banding strategy is likely to be determined on a per page/print job basis and so SoPEC will support the use of bands of any size.

Communication between SoPEC and the QA chips (i.e. INK_QA and PRINTER_QA) will take place on at least a per power cycle and per page basis. Communication with the QA chips has three principal purposes: validating the presence of genuine QA chips (i.e the printer is using approved consumables), validation of the amount of ink remaining in the cartridge and authenticating the operating parameters for the printer. After each page has been printed, SoPEC is expected to communicate the number of dots fired per ink plane to the QA chipset. SoPEC may also initiate decoy communications with the QA chips from time to time.

Process:
When validating ink consumption SoPEC is expected to principally act as a conduit between the PRINTER_QA and INK_QA chips and to take certain actions (basically enable or disable printing and report status to host PC) based on the result. The communication channels are insecure but all traffic is signed to guarantee authenticity.
Known Weaknesses
All communication to the QA chips is over the LSS interfaces using a serial communication protocol. This is open to observation and so the communication protocol could be reverse engineered. In this case both the PRINTER_QA and INK_QA chips could be replaced by impostor devices (e.g. a single FPGA) that successfully emulated the communication protocol. As this would require physical modification of each printer this is considered to be an acceptably low risk. Any messages that are not signed by one of the symmetric keys (such as the SoPEC_id_key) could be reverse engineered. The imposter device must also have access to the appropriate keys to crack the system.

If the secret keys in the QA chips are exposed or cracked then the system, or parts of it, is compromised.

Assumptions:

[1] The QA chips are not involved in the authentication of downloaded SoPEC code

[2] The QA chip in the ink cartridge (INK_QA) does not directly affect the operation of the cartridge in any way i.e. it does not inhibit the flow of ink etc.

[3] The INK_QA and PRINTER_QA chips are identical in their virgin state. They only become a INK_QA or PRINTER_QA after their FlashROM has been programmed.

Authentication of downloaded code in a single SoPEC system includes:

1) SoPEC identification by activity on USB end-points 2-4 indicates it is the ISIMaster (unless the SoPEC CPU has explicitly disabled this function).
2) The program is downloaded to the embedded DRAM.
3) The CPU calculates a SHA-1 hash digest of the downloaded program.
4) The ResetSrc register in the CPR block is read to determine whether or not a power-on reset occurred.
5) If a power-on reset occurred the signature of the downloaded code (which needs to be in a known location such as the first or last N bytes of the downloaded code) is decrypted using the Silverbrook public boot0key stored in ROM. This decrypted signature is the expected SHA-1 hash of the accompanying program. The encryption algorithm is likely to be a public key algorithm such as RSA. If a power-on reset did not occur then the expected SHA-1 hash is retrieved from the PSS and the compute intensive decryption is not required.
6) The calculated and expected hash values are compared and if they match then the programs authenticity has been verified.
7) If the hash values do not match then the host PC is notified of the failure and the SoPEC will await a new program download.
8) If the hash values match then the CPU starts executing the downloaded program.
9) If, as is very likely, the downloaded program wishes to download subsequent programs (such as OEM code) it is responsible for ensuring the authenticity of everything it downloads. The downloaded program may contain public keys that are used to authenticate subsequent downloads, thus forming a hierarchy of authentication. The SoPEC ROM does not control these authentications—it is solely concerned with verifying that the first program downloaded has come from a trusted source.
10) At some subsequent point OEM code starts executing. The Silverbrook supervisor code acts as an O/S to the OEM user mode code. The OEM code must access most SoPEC functionality via system calls to the Silverbrook code.
11) The OEM code is expected to perform some simple 'turn on the lights' tasks after which the host PC is informed that the printer is ready to print and the Start Printing use case comes into play.

Known Weaknesses:

If the Silverbrook private boot0key is exposed or cracked then the system is seriously compromised. A ROM mask change would be required to reprogram the boot0key.

Authentication of downloaded code in a multi-SoPEC system includes for ISIMaster SoPEC Process:

1) SoPEC identification by activity on USB end-points 2-4 indicates it is the ISIMaster.
2) The SCB is configured to broadcast the data received from the host PC.
3) The program is downloaded to the embedded DRAM and broadcasted to all ISISlave SoPECs over the ISI.
4) The CPU calculates a SHA-1 hash digest of the downloaded program.
5) The ResetSrc register in the CPR block is read to determine whether or not a power-on reset occurred.
6) If a power-on reset occurred the signature of the downloaded code (which needs to be in a known location such as the first or last N bytes of the downloaded code) is decrypted using the Silverbrook public boot0key stored in ROM. This decrypted signature is the expected SHA-1 hash of the accompanying program. The encryption algorithm is likely to be a public key algorithm such as RSA. If a power-on reset did not occur then the expected SHA-1 hash is retrieved from the PSS and the compute intensive decryption is not required.
7) The calculated and expected hash values are compared and if they match then the programs authenticity has been verified.
8) If the hash values do not match then the host PC is notified of the failure and the SoPEC will await a new program download.
9) If the hash values match then the CPU starts executing the downloaded program.
10) It is likely that the downloaded program will poll each ISISlave SoPEC for the result of its authentication process and to determine the number of slaves present and their ISIIds.
11) If any ISISlave SoPEC reports a failed authentication then the ISIMaster communicates this to the host PC and the SoPEC will await a new program download.
12) If all ISISlaves report successful authentication then the downloaded program is responsible for the downloading, authentication and distribution of subsequent programs within the multi-SoPEC system.
13) At some subsequent point OEM code starts executing. The Silverbrook supervisor code acts as an O/S to the OEM user mode code. The OEM code must access most SoPEC functionality via system calls to the Silverbrook code.
14) The OEM code is expected to perform some simple 'turn on the lights' tasks after which the master SoPEC determines that all SoPECs are ready to print. The host PC is informed that the printer is ready to print and the Start Printing use case comes into play.

Authentication of downloaded code in a multi-SoPEC system includes for ISISlave SoPEC Process:

1) When the CPU comes out of reset the SCB will be in slave mode, and the SCB is already configured to receive data from both the ISI and USB.
2) The program is downloaded (via ISI or USB) to embedded DRAM.
3) The CPU calculates a SHA-1 hash digest of the downloaded program.
4) The ResetSrc register in the CPR block is read to determine whether or not a power-on reset occurred.
5) If a power-on reset occurred the signature of the downloaded code (which needs to be in a known location such as the first or last N bytes of the downloaded code) is decrypted using the Silverbrook public boot0key stored in ROM. This decrypted signature is the expected SHA-1 hash of the accompanying program. The encryption algorithm is likely to be a public key algorithm such as RSA. If a power-on reset did not occur then the expected SHA-1 hash is retrieved from the PSS and the compute intensive decryption is not required.
6) The calculated and expected hash values are compared and if they match then the programs authenticity has been verified.
7) If the hash values do not match, then the ISISlave device will await a new program again
8) If the hash values match then the CPU starts executing the downloaded program.
9) It is likely that the downloaded program will communicate the result of its authentication process to the ISIMaster. The downloaded program is responsible for determining the SoPECs ISIId, receiving and authenticating any subsequent programs.
10) At some subsequent point OEM code starts executing. The Silverbrook supervisor code acts as an O/S to the OEM user mode code. The OEM code must access most SoPEC functionality via system calls to the Silverbrook code.
11) The OEM code is expected to perform some simple 'turn on the lights' tasks after which the master SoPEC is informed that this slave is ready to print. The Start Printing use case then comes into play.

Known Weaknesses

If the Silverbrook private boot0key is exposed or cracked then the system is seriously compromised.

ISI is an open interface i.e. messages sent over the ISI are in the clear. The communication channels are insecure but all traffic is signed to guarantee authenticity. As all communication over the ISI is controlled by Supervisor code on both the ISIMaster and ISISlave then this also provides some protection against software attacks.

10.5.4 Authentication and Upgrade of Operating Parameters for a Printer

The SoPEC IC will be used in a range of printers with different capabilities (e.g. A3/A4 printing, printing speed, resolution etc.). It is expected that some printers will also have a software upgrade capability which would allow a user to purchase a license that enables an upgrade in their printer's capabilities (such as print speed). To facilitate this it must be possible to securely store the operating parameters in the PRINTER_QA chip, to securely communicate these parameters to the SoPEC and to securely reprogram the parameters in the event of an upgrade. Note that each printing SoPEC (as opposed to a SoPEC that is only used for the storage of data) will have its own PRINTER_QA chip (or at least access to a PRINTER_QA that contains the SoPEC's SoPEC_id_key). Therefore both ISIMaster and ISISlave SoPECs will need to authenticate operating parameters.

Process:
1) Program code is downloaded and authenticated.
2) The program code has a function to create the SoPEC_id$_{13}$ key from the unique SoPEC_id that was programmed when the SoPEC was manufactured.
3) The SoPEC retrieves the signed operating parameters from its PRINTER_QA chip. The PRINTER_QA chip uses the SoPEC_id_key (which is stored as part of the pairing process executed during printhead assembly manufacture & test) to sign the operating parameters which are appended with a random number to thwart replay attacks.
4) The SoPEC checks the signature of the operating parameters using its SoPEC_id_key. If this signature authentication process is successful then the operating parameters are considered valid and the overall boot process continues. If not the error is reported to the host PC.
5) Operating parameters may also be set or upgraded using a second key, the PrintEngineLicense_key, which is stored on the PRINTER_QA and used to authenticate the change in operating parameters.

Known Weaknesses:

It may be possible to retrieve the unique SoPEC_id by placing the SoPEC in test mode and scanning it out. It is certainly possible to obtain it by reverse engineering the device. Either way the SoPEC_id (and by extension the SoPEC_id_key) so obtained is valid only for that specific SoPEC and so printers may only be compromised one at a time by parties with the appropriate specialised equipment. Furthermore even if the SoPEC_id is compromised, the other keys in the system, which protect the authentication of consumables and of program code, are unaffected.

The following defines the QA Chip Logical Interface, which provides authenticated manipulation of specific printer and consumable parameters. The interface is described in terms of data structures and the functions that manipulate them, together with examples of use. While the descriptions and examples are targetted towards the printer application, they are equally applicable in other domains.

The QA Chip Logical Interface is a logical interface, and is therefore implementation independent. Although this document does not cover implementation details on particular platforms, expected implementations include:

Software only
Off-the-shelf cryptographic hardware.
ASICs, such as SBR4320 and SOPEC for physical insertion into printers and ink cartridges
Smart cards.

The following symbolic nomenclature is used throughout this document:

TABLE 5

Summary of symbolic nomenclature

| Symbol | Description |
| --- | --- |
| F[X] | Function F, taking a single parameter X |
| F[X, Y] | Function F, taking two parameters, X and Y |
| X\|Y | X concatenated with Y |
| X∧Y | Bitwise X AND Y |
| X∨Y | Bitwise X OR Y (inclusive-OR) |
| X⊕Y | Bitwise X XOR Y (exclusive-OR) |
| ¬X | Bitwise NOT X (complement) |
| X ← Y | X is assigned the value Y |
| X ← {Y, Z} | The domain of assignment inputs to X is Y and Z |
| X = Y | X is equal to Y |
| X ≠ Y | X is not equal to Y |
| ⇓X | Decrement X by 1 (floor 0) |
| ⇑X | Increment X by 1 (modulo register length) |
| Erase X | Erase Flash memory register X |
| SetBits [X, Y] | Set the bits of the Flash memory register X based on Y |
| Z ←ShiftRight [X, Y] | Shift register X right one bit position, taking input bit from Y and placing the output bit in Z |
| a.b | Data field or member function 'b' in object a. |

An instance of a QA Chip Logical Interface (on any platform) is a QA Device.

QA Devices cannot talk directly to each other. A System is a logical entity which has one or more QA Devices connected logically (or physically) to it, and calls the functions on the QA Devices. The system is considered secure and the program running on the system is considered to be trusted.

The Trusted QA Device forms an integral part of the system itself and resides within the trusted environment of the system. It enables the system to extend trust to external QA Devices. The Trusted QA Device is only trusted because the system itself is trusted.

The External untrusted QA Device is a QA Device that resides external to the trusted environment of the system and is therefore untrusted. The purpose of the QA Chip Logical Interface is to allow the external untrusted QA Devices to become effectively trusted. This is accomplished when a Trusted QA Device shares a secret key with the external untrusted QA Device, or with a Translation QA Device (see below).

In a printing application external untrusted QA Devices would typically be instances of SBR4320 implementations located in a consumable or the printer.

A Translation QA Device is used to translate signatures between QA Devices and extend effective trust when secret keys are not directly shared between QA Devices.

The Translation QA Device must share a secret key with the Trusted QA Device that allows the Translation QA Device to effectively become trusted by the Trusted QA Device and hence trusted by the system. The Translation QA Device shares a different secret key with another external untrusted QA Device (which may in fact be a Translation QA Device etc). Although the Trusted QA Device doesn't share (know) the key of the external untrusted QA Device, signatures generated by that untrusted device can be translated by the Translation QA Device into signatures based on the key that the Trusted QA Device does know, and thus extend trust to the otherwise untrusted external QA Device.

In a SoPEC-based printing application, the Printer QA Device acts as a Translation QA Device since it shares a secret key with the SoPEC, and a different secret key with the ink carridges.

A Consumable QA Device is an external untrusted QA Device located in a consumable. It typically contains details about the consumable, including how much of the consumable remains.

In a printing application the consumable QA Device is typically found in an ink cartridge and is referred to as an Ink QA Device, or simply Ink QA since ink is the most common consumable for printing applications. However, other consumables in printing applications include media and impression counts, so consumable QA Device is more generic.

A Printer QA Device is an external untrusted device located in the printer. It contains details about the operating parameters for the printer, and is often referred to as a Printer QA.

A Value Upgrader QA Device contains the necessary functions to allow a system to write an initial value (e.g. an ink amount) into another QA Device, typically a consumable QA Device. It also allows a system to refill/replenish a value in a consumable QA Device after use.

Whenever a value upgrader QA Device increases the amount of value in another QA Device, the value in the value upgrader QA Device is correspondingly decreased. This means the value upgrader QA Device cannot create value—it can only pass on whatever value it itself has been issued with. Thus a value upgrader QA Device can itself be replenished or topped up by another value upgrader QA Device.

An example of a value upgrader is an Ink Refill QA Device, which is used to fill/refill ink amount in an Ink QA Device.

A Parameter Upgrader QA Device contains the necessary functions to allow a system to write an initial parameter value (e.g. a print speed) into another QA Device, typically a printer QA Device. It also allows a system to change that parameter value at some later date.

A parameter upgrader QA Device is able to perform a fixed number of upgrades, and this number is effectively a consumable value. Thus the number of available upgrades decreases by 1 with each upgrade, and can be replenished by a value upgrader QA Device. Secret batch keys are inserted into QA Devices during instantiation (e.g. manufacture).

These keys must be replaced by the final secret keys when the purpose of the QA Device is known. The Key Programmer QA Device implements all necessary functions for replacing keys in other QA Devices.

Digital signatures are used throughout the authentication protocols of the QA Chip Logical Interface. A signature is produced by passing data plus a secret key through a keyed hash function. The signature proves that the data was signed by someone who knew the secret key.

The signature function used throughout the QA Chip Logical Interface is HMAC-SHA1. This is a read of data from a non-trusted QA Device that also includes a check of the signature. When the System determines that the signature is correct for the returned data (e.g. by asking a trusted QA Device to test the signature) then the System is able to trust that the data has not been tampered en route from the read, and was actually stored on the non-trusted QA Device.

An authenticated write is a write to the data storage area in a QA Device where the write request includes both the new data and a signature. The signature is based on a key that has write access permissions to the region of data in the QA Device, and proves to the receiving QA Device that the writer has the authority to perform the write. For example, a Value Upgrader Refilling Device is able to authorize a system to perform an authenticated write to upgrade a Consumable QA Device (e.g. to increase the amount of ink in an Ink QA Device).

The QA Device that receives the write request checks that the signature matches the data (so that it hasn't been tampered with en route) and also that the signature is based on the correct authorization key.

An authenticated write can be followed by an authenticated read to ensure (from the system's point of view) that the write was successful.

A non-authenticated write is a write to the data storage area in a QA Device where the write request includes only the new data (and no signature). This kind of write is used when the system wants to update areas of the QA Device that have no access-protection.

The QA Device verifies that the destination of the write request has access permissions that permit anyone to write to it. If access is permitted, the QA Device simply performs the write as requested.

A non-authenticated write can be followed by an authenticated read to ensure (from the system's point of view) that the write was successful.

Authorized modification of data refers to modification of data via authenticated writes. Data structures are summarized as:

TABLE 2

List of data structures

| Group description | Name | Represented by | Size | Description |
|---|---|---|---|---|
| QA Device instance identifier | Chip Identifier | ChipId | 48 bits | Unique identifier for this QA Device. |
| Key and key related data | Number of Keys | NumKeys | 8 | Number of key slots available in this QA Device. |
| | Key | K | 160 bits per key | K is the secret key used for calculating signatures. $K^n$ is the key stored in the nth key slot. |
| | Key Identifier | KeyId | 31 bits per key | Unique identifier for each key. $KeyId^n$ is the key identifier for the key stored in slot n. |
| | KeyLock | KeyLock | 1 bit per key | Flag indicates whether the key is locked in the corresponding slot or not. $KeyLock^n$ is the key lock flag for slot n. |
| Operating and state data | Number of Memory Vectors | NumVectors | 4 | Number of 512 bit memory vectors in this QA Device. |
| | Memory Vector | M | 512 bits per M | M is a 512 bit memory vector. The 512-bit vector is divided into 16 × 32 bit words. |
| | | $M^0$ | | $M^0$ stores application specific data that is protected by access permissions for key-based and non-key based writes. |
| | | $M^1$ | | $M^1$ stores the attributes for $M^0$, and is write-once-only. |
| | | $M^{2+}$ | | $M^{2+}$ stores application specific data that is protected only by non key-based access permissions. |
| | Permissions | $P^n$ | 16 bits per P | Access permissions for each word of $M^{1+}$. n = number of $M^{1+}$ vectors |
| Session data | Random Number | R | 160 bits | Current random number used to ensure time varying messages. Changes after each successful authentication or signature generation. |

Each QA Device requires an identifier that allows unique identification of that QA Device by external systems, ensures that messages are received by the correct QA Device, and ensures that the same device can be used across multiple transactions.

Strictly speaking, the identifier only needs to be unique within the context of a key, since QA Devices only accept messages that are appropriately signed. However it is more convenient to have the instance identifier completely unique, as is the case with this design. The identifier functionality is provided by ChipId.

ChipId is the unique 64-bit QA Device identifier. The ChipId is set when the QA Device is instantiated, and cannot be changed during the lifetime of the QA Device.

A 64-bit ChipId gives a maximum of 1844674 trillion unique QA Devices.

Each QA Device contains a number of secret keys that are used for signature generation and verification. These keys serve two basic functions:

For reading, where they are used to verify that the read data came from the particular QA Device and was not altered en route.

For writing, where they are used to ensure only authorised modification of data. Both of these functions are achieved by signature generation; a key is used to generate a signature for subsequent transmission from the device, and to generate a signature to compare against a received signature.

The number of secret keys in a QA Device is given by NumKeys. For this version of the QA Chip Logical Interface, NumKeys has a maximum value of 8.

Each key is referred to as K, and the subscripted form $K_n$ refers to the nth key where n has the range 0 to NumKeys-1 (i.e. 0 to 7). For convenience we also refer to the nth key as being the key in the nth keyslot.

The length of each key is 160-bits. 160-bits was chosen because the output signature length from the signature generation function (HMAC-SHA1) is 160 bits, and a key longer than 160-bits does not add to the security of the function.

The security of the digital signatures relies upon keys being kept secret. To safeguard the security of each key, keys should be generated in a way that is not deterministic. Ideally each key should be programmed with a physically generated random number, gathered from a physically random phenomenon. Each key is initially programmed during QA Device instantiation.

Since all keys must be kept secret and must never leave the QA Device, each key has a corresponding 31-bit KeyId which can be read to determine the identity or label of the key without revealing the value of the key itself Since the relationship between keys and Key-Ids is 1:1, a system can read all the KeyIds from a QA Device and know which keys are stored in each of the keyslots.

Finally, each keyslot has a corresponding 1-bit KeyLock status indicating whether the key in that slot/position is allowed to be replaced (securely replaced, and only if the old key is known). Once a key has been locked into a slot, it cannot be unlocked i.e. it is the final key for that slot. A key can only be used to perform authenticated writes of data when it has been locked into its keyslot (i.e. its KeyLock status=1).

Thus each of the NumKeys keyslots contains a 160-bit key, a 31-bit KeyId, and a 1-bit KeyLock.

To create a digital signature, we pass the data to be signed together with a secret key through a key dependent one-way hash function. The key dependent one-way hash function used throughout the QA Chip Logical Interface is HMAC-SHA1[1].

Signatures are only of use if they can be validated i.e. QA Device A produces a signature for data and QA Device B can check if the signature was valid for that particular data. This implies that A and B must share some secret information so that they can generate equivalent signatures.

Common key signature generation is when QA Device A and QA Device B share the exact same key i.e. key $K_A$=key $K_B$. Thus the signature for a message produced by A using $K_A$ can be equivalently produced by B using $K_B$. In other words $SIG_{K_A}$(message)=$SIG_{K_B}$(message) because key $K_A$=key $K_B$.

Variant key signature generation is when QA Device B holds a base key, and QA Device A holds a variant of that key such that $K_A$=owf($K_B$,$U_A$) where owf is a one-way function based upon the base key ($K_B$) and a unique number in A ($U_A$). Thus A can produce $SIG_{K_A}$(message), but for B to produce an equivalent signature it must produce $K_A$ by reading $U_A$ from A and using its base key $K_B$. $K_A$ is referred to as a variant key and $K_B$ is referred to as the base/common key. Therefore, B can produce equivalent signatures from many QA Devices, each of which has its own unique variant of $K_B$. Since ChipId is unique to a given QA Device, we use that as $U_A$. A one-way function is required to create $K_A$ from $K_B$ or it would be possible to derive $K_B$ if $K_A$ were exposed.

Common key signature generation is used when A and B are equally available[2] to an attacker. For example, Printer QA Devices and Ink QA Devices are equally available to attackers (both are commonly available to an attacker), so shared keys between these two devices should be common keys.

[2] The term "equally available" is relative. It typically means that the ease of availability of both are the effectively the same, regardless of price (e.g. both A and B are commercially available and effectively equally easy to come by).

Variant key signature generation is used when B is not readily available to an attacker, and A is readily available to an attacker. If an attacker is able to determine $K_A$, they will not know $K_A$ for any other QA Device of class A, and they will not be able to determine $K_B$. The QA Device producing or testing a signature needs to know if it must use the common or variant means of signature generation. Likewise, when a key is stored in a QA Device, the status of the key (whether it is a base or variant key) must be stored along with it for future reference. Both of these requirements are met using the KeyId as follows:

The 31-bit KeyId is broken into two parts:
A 30-bit unique identifier for the key. Bits 30-1 represents the Id.
A 1-bit Variant Flag, which represents whether the key is a base key or a variant key. Bit 0 represents the Variant Flag.

Table 6 describes the relationship of the Variant Flag with the key.

TABLE 6

Variant Flag representation

| value | Key represented |
|---|---|
| 0 | Base key |
| 1 | Variant key |

Figure 9:
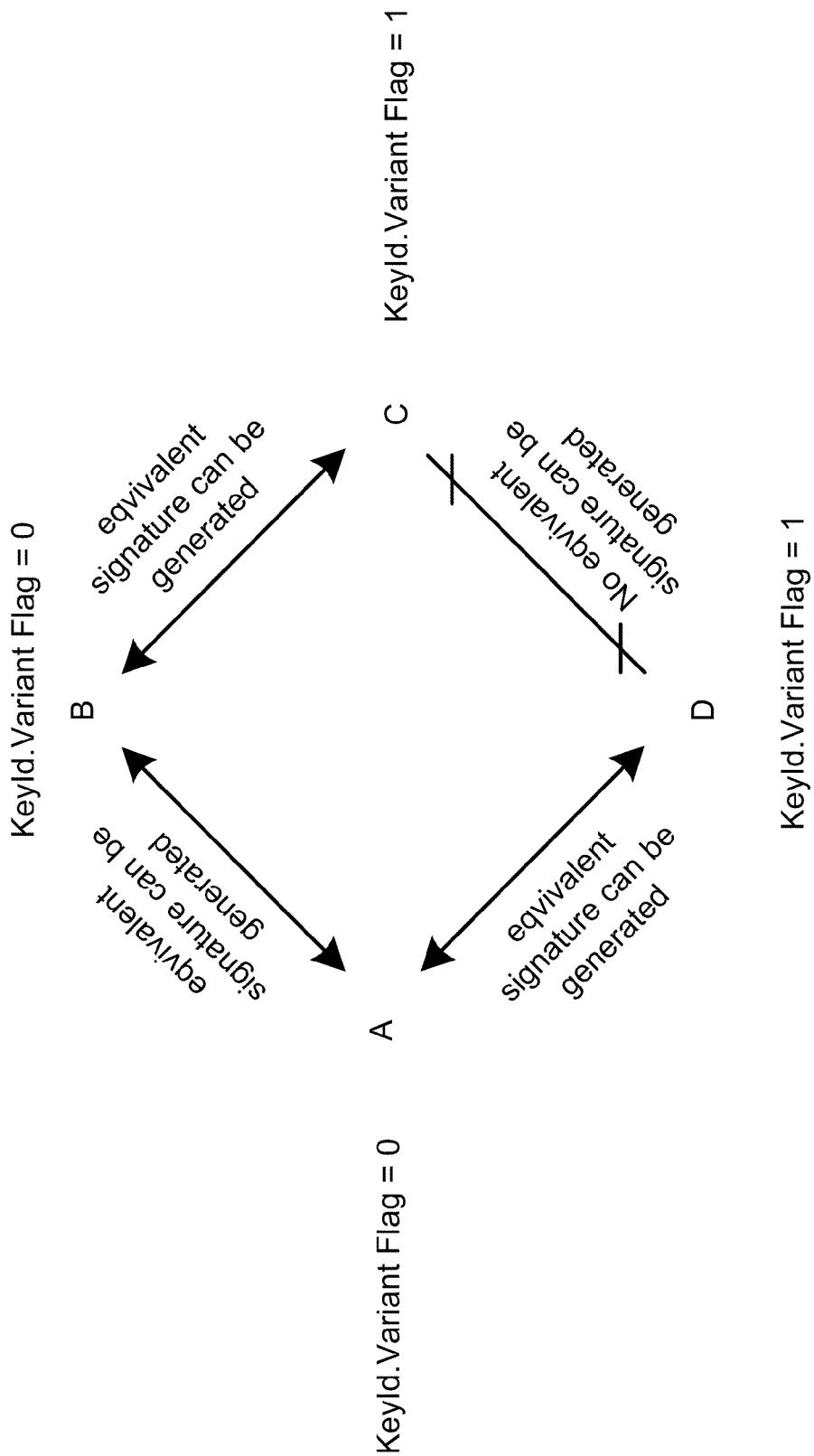
FIG. 9 shows equivalent signature generation
Figure 10:
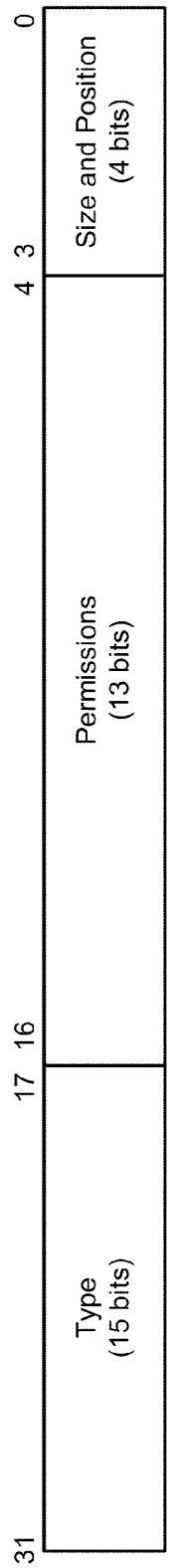
FIG. 10 shows a basic field definition

Equivalent signature generation between 4 QA Devices A, B, C and D is shown in FIG. 9. Each device has a single key. KeyId.Id of all four keys are the same i.e $KeyId_A.Id$=$KeyId_B.Id$=$KeyId_C.Id$=$KeyId_D.Id$.

If $KeyId_A$.VariantFlag=0 and $KeyId_B$.VariantFlag=0, then a signature produced by A, can be equivalently produced by B because $K_A$=$K_B$.

If $KeyId_B$.VariantFlag=0 and $KeyId_C$.VariantFlag=1, then a signature produced by C, is equivalently produced by B because $K_C$=f ($K_B$, $ChipId_C$).

If $KeyId_C$.VariantFlag=1 and $KeyId_D$.VariantFlag=1, then a signature produced by C, cannot be equivalently produced by D because there is no common base key between the two devices.

If $KeyId_D$.VariantFlag=1 and $KeyId_A$.VariantFlag=0, then a signature produced by D, can be equivalently produced by A because $K_D$=f ($K_A$, $ChipId_D$).

The primary purpose of a QA Device is to securely hold application-specific data. For example if the QA Device is an Ink QA Device it may store ink characteristics and the amount of ink-remaining If the QA Device is a Printer QA Device it may store the maximum speed and width of printing.

For secure manipulation of data:
Data must be clearly identified (includes typing of data).
Data must have clearly defined access criteria and permissions.

The QA Chip Logical Interface contains structures to permit these activities.

The QA Device contains a number of kinds of data with differing access requirements:
Data that can be decremented by anyone, but only increased in an authorised fashion e.g. the amount of ink-remaining in an ink cartridge.
Data that can only be decremented in an authorised fashion e.g. the number of times a Parameter Upgrader QA Device has upgraded another QA Device.
Data that is normally read-only, but can be written to (changed) in an authorised fashion e.g. the operating parameters of a printer.
Data that is always read-only and doesn't ever need to be changed e.g. ink attributes or the serial number of an ink cartridge or printer.
Data that is written by QACo/Silverbrook, and must not be changed by the OEM or end user e.g. a license number containing the OEM's identification that must match the software in the printer.
Data that is written by the OEM and must not be changed by the end-user e.g. the machine number that filled the ink cartridge with ink (for problem tracking).

M is the general term for all of the memory (or data) in a QA Device. M is further subscripted to refer to those different parts of M that have different access requirements as follows:
$M_0$ contains all of the data that is protected by access permissions for key-based (authenticated) and non-key-based (non-authenticated) writes.
$M_1$ contains the type information and access permissions for the $M_0$ data, and has write-once permissions (each sub-part of $M_1$ can only be written to once) to avoid the possibility of changing the type or access permissions of something after it has been defined.
$M_2$, $M_3$ etc., referred to as $M_{2+}$, contains all the data that can be updated by anyone until the permissions for those sub-parts of $M_{2+}$ have changed from read/write to read-only.

While all QA Devices must have at least $M_0$ and $M_1$, the exact number of memory vectors ($M_n$s) available in a particular QA Device is given by NumVectors. In this version of the QA Chip Logical Interface there are exactly 4 memory vectors, so NumVectors=4. Each $M_n$ is 512 bits in length, and is further broken into 16×32 bit words. The ith word of $M_n$ is referred to as $M_n$[i]. M[0] is the least significant word of $M_n$, and $M_n$[15] is the most significant word of $M_n$.

In the general case of data storage, it is up to the external accessor to interpret the bits in any way it wants. Data structures can be arbitrarily arranged as long as the various pieces of software and hardware that interpret those bits do so consistently. However if those bits have value, as in the case of a consumable, it is vital that the value cannot be increased without appropriate authorisation, or one type of value cannot be added to another incompatible kind e.g. dollars should never be added to yen.

Therefore $M_0$ is divided into a number of fields, where each field has a size, a position, a type and a set of permissions. $M_0$ contains all of the data that requires authenticated write access (one data element per field), and $M_1$ contains the field information i.e. the size, type and access permissions for the data stored in $M_0$.

Each 32-bit word of $M_1$ defines a field. Therefore there is a maximum of 16 defined fields. $M_1[0]$ defines field 0, $M_1[1]$ defines field 1 and so on. Each field is defined in terms of:
  size and position, to permit external accessors determine where a data item is
  type, to permit external accessors determine what the data represents
  permissions, to ensure approriate access to the field by external accessors.

The 32-bit value $M_1[n]$ defines the conceptual field attributes for field n as follows:

With regards to consistency of interpretation, the type, size and position information stored in the various words of $M_1$ allows a system to determine the contents of the corresponding fields (in $M_0$) held in the QA Device. For example, a 3-color ink cartridge may have an Ink QA Device that holds the amount of cyan ink in field 0, the amount of magenta ink in field 1, and the amount of yellow ink in field 2, while another single-color Ink QA Device may hold the amount of yellow ink in field 0, where the size of the fields in the two Ink QA Devices are different.

A field must be defined (in $M_1$) before it can be written to (in $M_0$). At QA Device instantiation, the whole of $M_0$ is 0 and no fields are defined (all of $M_1$ is 0). The first field (field 0) can only be created by writing an appropriate value to $M_1[0]$. Once field 0 has been defined, the words of $M_0$ corresponding to field 0 can be written to (via the appropriate permissions within the field definition $M_1[0]$).

Once a field has been defined (i.e. $M_1[n]$ has been written to), the size, type and permissions for that field cannot be changed i.e. $M_1$ is write-once. Otherwise, for example, a field could be defined to be lira and given an initial value, then the type changed to dollars.

The size of a field is measured in terms of the number of consecutive 32-bit words it occupies. Since there are only 16×32-bit words in $M_0$, there can only be 16 fields when all 16 fields are defined to be 1 word sized each. Likewise, the maximum size of a field is 512 bits when only a single field is defined, and it is possible to define two fields of 256-bits each. Once field 0 has been created, field 1 can be created, and so on. When enough fields have been created to allocate all of $M_0$, the remaining words in $M_1$ are available for write-once general data storage purposes.

It must be emphasised that when a field is created the permissions for that field are final and cannot be changed. This also means that any keys referred to by the field permissions must be already locked into their keyslots. Otherwise someone could set up a field's permissions that the key in a particular keyslot has write access to that field without any guarantee that the desired key will be ever stored in that slot (thus allowing potential mis-use of the field's value).

A field's size and position are defined by means of 4 bits (referred to as EndPos) that point to the least significant word of the field, with an implied position of the field's most significant word. The implied position of field 0's most significant word is $M_0[15]$. The positions and sizes of all fields can therefore be calculated by starting from field 0 and working upwards until all the words of $M_0$ have been accounted for.

The default value of $M_1[0]$ is 0, which means field0.endPos=0. Since field0.startPos=15, field 0 is the only field and is 16 words long.

Suppose for example, we want to allocate 4 fields as follows:
  field 0: 128 bits (4×32-bit words)
  field 1: 32 bits (1×32-bit word)
  field 2: 160 bits (5×32-bit words)
  field 3: 192 bits (6×32-bit words)

Field 0's position and size is defined by $M_1[0]$, and has an assumed start position of 15, which means the most significant word of field 0 must be in $M_0[15]$. Field 0 therefore occupies $M_0[12]$ through to $M_0[15]$, and has an endPos value of 12.

Field 1's position and size is defined by $M_1[1]$, and has an assumed start position of 11 (i.e. $M_1[0]$.endPos−1). Since it has a length of 1 word, field 1 therefore occupies only $M_0[11]$ and its end position is the same as its start position i.e. its endPos value is 11. Likewise field 2's position and size is defined by $M_1[2]$, and has an assumed start position of 10 (i.e. $M_1[1]$.endPos−1). Since it has a length of 5 words, field 2 therefore occupies $M_0[6]$ through to $M_0[10]$ and has an endPos value of 6.

Finally, field 3's position and size is defined by $M_1[3]$, and has an assumed start position of 5 (i.e. $M_1[2]$.endPos−1). Since it has a length of 6 words, field 3 therefore occupies $M_0[5]$ through to $M_0[0]$ and has an endPos value of 0.

Since all 16 words of $M_0$ are now accounted for in the 4 fields, the remaining words of $M_1$ (i.e. $M_1[4]$ though to $M_1[15]$) are ignored, and can be used for any write-once (and thence read-only) data.

Figure 11:
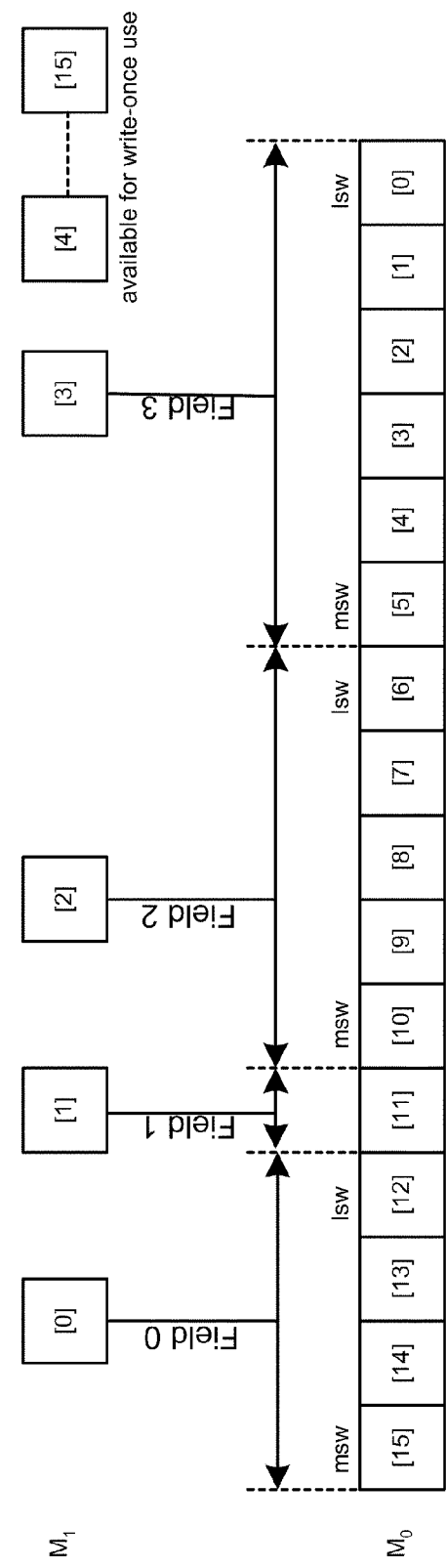
FIG. 11 shows an example of defining field sizes and positions

FIG. 11 shows the same example in diagramatic format.

The system must be able to identify the type of data stored in a field so that it can perform operations using the correct data. For example, a printer system must be able identify which of a consumable's fields are ink fields (and which field is which ink) so that the ink usage can be correctly applied during printing.

A field's type is defined by 15 bits.

The default value of $M_1[0]$ is 0, which means field0.type=0 (i.e. non-initialised). Strictly speaking, the type need only be interpreted by all who can securely read and write to that field i.e. within the context of one or more keys. However it is convenient if possible to keep all types unique for simplistic identification of data across all applications. In the general case, an external system communicating with a QA Device can identify the data stored in M0 in the following way:
  Read the KeyId of the key that has permission to write to the field. This will a give broad identification of the data type, which may be sufficient for certain applications.
  Read the type attribute for the field to narrow down the identity within the broader context of the KeyId.

For example, the printer system can read the KeyId to deduce that the data stored in a field can be written to via the HP_Network_InkRefill key, which means that any data is of the general ink category known to HP Network printers. By further reading the type attribute for the field the system can determine that the ink is Black ink.

All fields can be ready by everyone. However writes to fields are governed by 13-bits of permissions that are present in each field's attribute definition. The permissions describe who can do what to a specific field.

Writes to fields can either be authenticated (i.e. the data to be written is signed by a key and this signature must be checked by the receiving device before write access is given) or non-authenticated (i.e. the data is not signed by a key). Therefore we define a single bit (AuthRW) that specifies whether authenticated writes are permitted, and a single bit (Non-AuthRW) specifying whether non-authenticated writes are permitted. Since it is pointless to permit both authenticated and non-authenticated writes to write any value (the authentciated writes are pointless), we further define the case when both bits are set to be interpreted as authenticated writes are permitted, but non-authenticated writes only succeed when the new value is less than the previous value i.e. the permission is decrement-only. The interpretation of these two bits is shown in Table 7.

TABLE 7

Interpretation of AuthRW and NonAuthRW

| NonAuthRW | AuthRW | Interpretation |
|---|---|---|
| 0 | 0 | Read-only access (no-one can write to this field). This is the initial state for each field. At instantiation all of $M_1$ is 0 which means AuthRW and NonAuthRW are 0 for each field, and hence none of $M_0$ can be written to until a field is defined. |
| 0 | 1 | Authenticated write access is permitted Non-authenticated write acecss is not permitted |
| 1 | 0 | Authenticated write access is not permitted Non-authenticated write access is permitted (i.e. anyone can write to this field) |
| 1 | 1 | Authenticated write access is permitted Non-authenticated write access is decrement-only. |

If authenticated write access is permitted, there are 11 additional bits (bringing the total number of permission bits to 13) to more fully describe the kind of write access for each key. We only permit a single key to have the ability to write any value to the field, and the remaining keys are defined as being either not permitted to write, or as having decrement-only write access. A 3-bit KeyNum represents the slot number of the key that has the ability to write any value to the field (as long as the key is locked into its key slot), and an 8-bit KeyPerms defines the write permissions for the (maximum of) 8 keys as follows:

KeyPerms[n]=0: The key in slot n (i.e. $K_n$) has no write access to this field (except when n=KeyNum). Setting KeyPerms to 0 prohibits a key from transferring value (when an amount is deducted from field in one QA Device and transferred to another field in a different QA Device)

KeyPerms[n]=1: The key in slot n (i.e. $K_n$) is permitted to perform decrement-only writes to this field (as long as $K_n$ is locked in its key slot). Setting KeyPerms to 1 allows a key to transfer value (when an amount is deducted from field in one QA Device and transferred to another field in a different QA Device).

The 13-bits of permissions (within bits 4-16 of $M_1[n]$) are allocated as follows:

FIG. 13 shows an example of permission bits for a field.
In this example we can see:
NonAuthRW=0 and AuthRW=1, which means that only authenticated writes are allowed i.e. writes to the field without an appropriate signature are not permitted.
KeyNum=3, so the only key permitted to write any value to the field is key 3 (i.e. $K_3$).
KeyPerms[3]=0, which means that although key 3 is permitted to write to this field, key 3 can't be used to transfer value from this field to other QA Devices.

KeyPerms[0,4,5,6,7]=0, which means that these respective keys cannot write to this field.
KeyPerms[1,2]=1, which means that keys 1 and 2 have decrement-only access to this field i.e. they are permitted to write a new value to the field only when the new value is less than the current value.

FIG. 14 shows a second example of permission bits for a field.
In this example we can see:
NonAuthRW and AuthRW=1, which means that authenticated writes are allowed and writes to the field without a signature are only permitted when the new value is less than the current value (i.e. non-authenticated writes have decrement-only permission).
KeyNum=3, so the only key permitted to write any value to the field is key 3 (i.e. $K_3$).
KeyPerms[3]=1, which means that key 3 is permitted to write to this field, and can be used to transfer value from this field to other QA Devices.
KeyPerms[0,4,5,6,7]=0, which means that these respective keys cannot write to this field.
KeyPerms[1,2]=1, which means that keys 1 and 2 have decrement-only access to this field i.e. they are permitted to write a new value to the field only when the new value is less than the current value.

FIG. 15 shows the breakdown of bits within the 32-bit field attribute value $M_1[n]$. Table 8 summarises each attribute.

TABLE 8

Attributes for a field

| Attribute | Sub-attribute name | Size in bits | Interpretation |
|---|---|---|---|
| Type | Type | 15 | Gives additional identification of the data stored in the field within the context of the accessors of that field. |
| Permissions | KeyNum | 3 | The slot number of the key that has authenticated write access to the field. |
|  | NonAuthRW | 1 | 0 = non-authenticated writes are not permitted to this field. 1 = non-authenticated writes are permitted to this field (see Table 7). |
|  | AuthRW | 1 | 0 = authenticated writes are not permitted to this field. 1 = authenticated writes are permitted to this field. |
|  | KeyPerms | 8 | Bitmap representing the write permissions for each of the keys when AuthRW = 1. For each bit: 0 = no write access for this key (except for key KeyNum) 1 = decrement-only access is permitted for this key. |
| Size and Position | EndPos | 4 | The word number in $M_0$ that holds the lsw of the field. The msw is held in [fieldNum−1], where msw of field 0 is 15. |

$M_1$ holds the field attributes for data stored in $M_0$, and each word of $M_1$ can be written to once only. It is important that a system can determine which words are available for writing. While this can be determined by reading $M_1$ and determining which of the words is non-zero, a 16-bit permissions value $P_1$ is available, with each bit indicating whether or not a given word in $M_1$ has been written to. Bit n of $P_1$ represents the permissions for $M_1[n]$ as follows:

TABLE 9

Interpretation of $P_1[n]$ i.e. bit n of $M_1$'s permission

| | Description |
|---|---|
| 0 | writes to $M_1[n]$ are not permitted i.e. this word is now read-only |
| 1 | writes to $M_1[n]$ are permitted |

Since $M_1$ is write-once, whenever a word is written to in $M_1$, the corresponding bit of $P_1$ is also cleared, i.e. writing to $M_1[n]$ clears $P_1[n]$.

Writes to $M_1[n]$ only succeed when all of $M_1[0 \ldots n-1]$ have already written to (i.e. previous fields are defined) i.e.

$M_1[0 \ldots n-1]$ must have already been written to (i.e. $P_1[0 \ldots n-1]$ are 0)

$P_1[n]=1$ (i.e. it has not yet been written to)

In addition, if $M_1[n-1].endPos \neq 0$, the new $M_1[n]$ word will define the attributes of field n, so must be further checked as follows:

The new $M_1[n].endPos$ must be valid (i.e. must be less than $M_1[n-1].endPos$)

If the new $M_1[n].authRW$ is set, $K_{keyNum}$ must be locked, and all keys referred to by the new $M_1[n].keyPerms$ must also be locked.

However if $M_1[n-1].endPos=0$, then all of $M_0$ has been defined in terms of fields. Since enough fields have been created to allocate all of $M_0$, any remaining words in $M_1$ are available for write-once general data storage purposes, and are not checked any further. $M_2$, $M_3$ etc., referred to as $M_{2+}$, contains all the data that can be updated by anyone (i.e. no authenticated write is required) until the permissions for those sub-parts of $M_{2+}$ have changed from read/write to read-only.

The same permissions representation as used for $M_1$ is also used for $M_{2+}$. Consequently $P_n$ is a 16-bit value that contains the permissions for $M_n$ (where n>0). The permissions for word w of $M_n$, is given by a single bit $P_n[w]$. However, unlike writes to $M_1$, writes to $M_{2+}$ do not automatically clear bits in P. Only when the bits in $P_{2+}$ are explictly cleared (by anyone) do those corresponding words become read-only and final.

In a printing application, an ink cartridge contains an Ink QA Device storing the ink-remaining values for that ink cartridge. The ink-remaining values decrement as the ink cartridge is used to print. When an ink cartridge is physically re/filled, the Ink QA Device needs to be logically re/filled as well. Therefore, the main purpose of an upgrade is to re/fill the ink-remaining values of an Ink QA Device in an authorised manner.

The authorisation for a re/fill is achieved by using a Value Upgrader QA Device which contains all the necessary functions to re/write to the Ink QA Device. In this case, the value upgrader is called an Ink Refill QA Device, which is used to fill/refill ink amount in an Ink QA Device.

When an Ink Refill QA Device increases (additive) the amount of ink-remaining in an Ink QA Device, the amount of ink-remaining in the Ink Refill QA Device is correspondingly decreased. This means that the Ink Refill QA Device can only pass on whatever ink-remaining value it itself has been issued with. Thus an Ink Refill QA Device can itself be replenished or topped up by another Ink Refill QA Device.

The Ink Refill QA Device can also be referred to as the Upgrading QA Device, and the Ink QA Device can also be referred to as the QA Device being upgraded.

The refill of ink can also be referred to as a transfer of ink, or transfer of amount/value, or an upgrade.

Typically, the logical transfer of ink is done only after a physical transfer of ink is successful.

The transfer process has two basic requirements:

The transfer can only be performed if the transfer request is valid. The validity of the transfer request must be completely checked by the Ink Refill QA Device, before it produces the required output for the transfer. It must not be possible to apply the transfer output to the Ink QA Device, if the Ink Refill QA Device has been already been rolled back for that particular transfer.

A process of rollback is available if the transfer was not received by the Ink QA Device. A rollback is performed only if the rollback request is valid. The validity of the rollback request must be completely checked by the Ink Refill QA Device, before it adjusts its value to a previous value before the transfer request was issued. It must not be possible to rollback an Ink Refill QA Device for a transfer which has already been applied to the Ink QA Device i.e the Ink Refill QA Device must only be rolled back for transfers that have actually failed.

Figure 16:
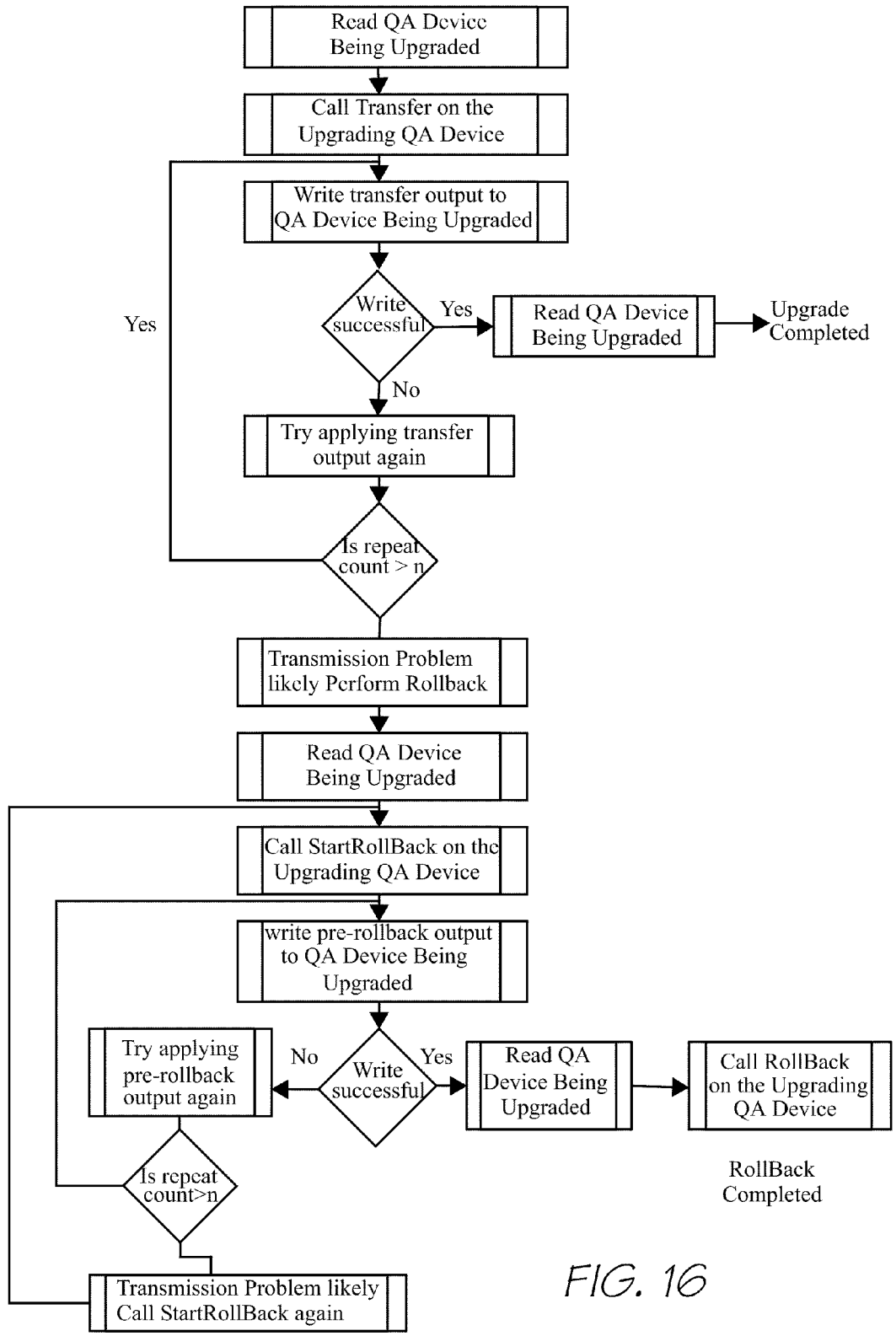
FIG. 16 shows transfer and rollback process

The transfer and rollback process is shown in FIG. 16.

Following is a sequential description of the transfer and rollback process:

1. The System Reads the memory vectors M0 and M1 of the Ink QA Device. The output from the read which includes the M0 and M1 words of the Ink QA Device, and a signature, is passed as an input to the Transfer Request. It is essential that M0 and M1 are read together. This ensures that the field information for M0 fields are correct, and have not been modified, or substituted from another device. Entire M0 and M1 must be read to verify the correctness of the subsequent Transfer Request by the Ink Refill QA Device.

2. The System makes a Transfer Request to the Ink Refill QA Device with the amount that must be transferred, the field in the Ink Refill QA Device the amount must be transferred from, and the field in Ink QA Device the amount must be transferred to. The Transfer Request also includes the output from Read of the Ink QA Device. The Ink Refill QA Device validates the Transfer Request based on the Read output, checks that it has enough value for a successful transfer, and then produces the necessary Transfer Output. The Transfer Output typically consists of new field data for the field being refilled or upgraded, additional field data required to ensure the correctness of the transfer/rollback, along with a signature.

3. The System then applies the Transfer Output to the Ink QA Device, by calling an authenticated Write function on it, passing in the Transfer Output. The Write is either successful or not. If the Write is not successful, then the System will repeat calling the Write function using the same transfer output, which may be successful or not. If unsuccesful the System will initiate a rollback of the transfer. The rollback must be performed on the Ink Refill QA Device, so that it can adjust its value to a previous value before the current Transfer Request was initiated. It is not necessary to perform a rollback immediately after a failed Transfer. The Ink QA Device can still be used to print, if there is any ink remaining in it.

4. The System starts a rollback by Reading the memory vectors M0 and M1 of the Ink QA Device.

5. The System makes a StartRollBack Request to the Ink Refill QA Device with same input parameters as the Transfer Request, and the output from Read in (4). The Ink Refill QA Device validates the StartRollBack Request based on the Read output, and then produces the necessary Pre-rollback output. The Pre-rollback output consists only of additional field data along with a signature.
6. The System then applies the Pre-rollback Output to the Ink QA Device, by calling an authenticated Write function on it, passing in the Pre-rollback output. The Write is either successful or not. If the Write is not successful, then either (6), or (5) and (6) must be repeated.
7. The System then Reads the memory vectors M0 and M1 of the Ink QA Device.
8. The System makes a RollBack Request to the Ink Refill QA Device with same input parameters as the Transfer Request, and the output from Read (7). The Ink Refill QA Device validates the RollBack Request based on the Read output, and then rolls back its field corresponding to the transfer.

As we mentioned, the Ink QA Device stores ink-remaining values in its M0 fields, and its corresponding $M_1$ words contains field information for its ink-remaining fields. The field information consists of the size of the field, the type of data stored in field and the access permission to the field.

The Ink Refill QA Device also stores its ink-remaining values in its M0 fields, and its corresponding $M_1$ words contains field information for its ink-remaining fields.

The basic authorisation for a transfer comes from a key, which has authenticated ReadWrite permission (stored in field information as KeyNum) to the ink-remaining field (to which ink will be transferred) in the Ink QA Device. We will refer to this key as the refill key. The refill key must also have authenticated decrement-only permission for the ink-remaining field (from which ink will be transferred) in the Ink Refill QA Device. After validating the input transfer request, the Ink Refill QA Device will decrement the amount to be transferred from its ink-remaining field, and produce a transfer amount (previous ink-remaining amount in the Ink QA Device+transfer amount), additional field data, and a signature using the refill key. Note that the Ink Refill QA Device can decrement its ink-remaining field only if the refill key has the permission to decrement it. The signature produced by the Ink Refill QA Device is subsequently applied to the Ink QA Device. The Ink QA Device will accept the transfer amount only if the signature is valid. Note that the signature will only be valid if it was produced using the refill key which has write permission to the ink-remaining field being written.

The Ink Refill QA Device validates the transfer request by matching the Type of the data in ink-remaining information field of Ink QA Device to the Type of data in ink-remaining information field of the Ink Refill QA Device. This ensures that equivalent data Types are transferred i.e Network_OEM1_infrared ink is not transferred to Network_OEM1_cyan ink.

Additional validation of the transfer request must also be performed before a transfer output is generated by the Ink Refill QA Device. These are as follows:

For the Ink Refill QA Device:
1. Whether the field being upgraded is actually present.
2. Whether the field being upgraded can hold the upgraded amount.

For the Ink QA Device:
1. Whether the field from which the amount is transferred is actually present.
2. Whether the field has sufficient amount required for the transfer. To facilitate a rollback, the Ink Refill QA Device will store a list of transfer requests processed by it. This list is referred to as the Xfer Entry cache. Each record in the list consists of the transfer parameters corresponding to the transfer request.

A rollback request is validated by looking through the Xfer Entry of the Ink Refill QA Device and finding the request that should be rolled back. After the right transfer request is found the Ink Refill QA Device checks that the output from the transfer request was not applied to the Ink QA Device by comparing the current Read of the Ink QA Device to the values in the Xfer Entry cache, and finally rolls back its ink-remaining field (from which the ink was transferred) to a previous value before the transfer request was issued.

The Ink Refill QA Device must be absolutely sure that the Ink QA Device didn't receive the transfer. This factor determines the additional fields that must be written along with transfer amount, and also the parameters of the transfer request that must be stored in the Xfer Entry cache to facilitate a rollback, to prove that the Printer QA Device didn't actually receive the transfer.

The rollback process must ensure that the transfer output (which was previously produced) for which the rollback is being performed, cannot be applied after the rollback has been performed.

How do we achieve this? There are two separate decrement-only sequence fields (SEQ_1 and SEQ_2) in the Ink QA Device which can only be decremented by the Ink Refill QA Device using the refill key. The nature of data to be written to the sequence fields is such that either the transfer output or the pre-rollback output can be applied to the Ink QA Device, but not both i.e they must be mutually exclusive. Refer to Table 10 for details.

TABLE 10

Sequence field data for Transfer and Pre-rollback

| | Sequence Field data written to Ink QA Device | | |
|---|---|---|---|
| Function | SEQ_1 | SEQ_2 | Explanation |
| Initialised | 0xFFFFFFFF | 0xFFFFFFFF | Written using the sequence key which is different from the refill key |
| Write using Transfer Output | (Previous Value − 2) If Previous Value = intialised value then 0xFFFFFFFD | (Previous Value − 1) If Previous Value = intialised value then 0xFFFFFFFE | Written using the refill key using the refill key which has decrement-only permission on the fields. Value cannot be written if pre-rollback output is already written. |

TABLE 10-continued

Sequence field data for Transfer and Pre-rollback

| | Sequence Field data written to Ink QA Device | | |
|---|---|---|---|
| Function | SEQ_1 | SEQ_2 | Explanation |
| Write usiing Pre-rollback | (Previous Value − 1) If Previous Value = intialised value then 0xFFFFFFFE | (Previous Value − 2) If Previous Value = intialised value then 0xFFFFFFFD | Written using the refill key using the refill key which has decrement-only permission on the fields. Value can be written only if Transfer Output has not been written. |

The two sequence fields are initialised to 0xFFFFFFFF using sequence key. The sequence key is different to the refill key, and has authenticated ReadWrite permission to both the sequence fields.

The transfer output consists of the new data for the field being upgraded, field data of the two sequence fields, and a signature using the refill key. The field data for SEQ_1 is decremented by 2 from the original value that was passed in with the transfer request. The field data for SEQ_2 is decremented by 1 from the original value that was passed in with the transfer request.

The pre-rollback output consists only of the field data of the two sequence fields, and a signature using the refill key. The field data for SEQ_1 is decremented by 1 from the original value that was passed in with the transfer request. The field data for SEQ_2 is decremented by 2 from the original value that was passed in with the transfer request.

Since the two sequence fields are decrement-only fields, the writing of the transfer output to QA Device being upgraded will prevent the writing of the pre-rollback output to QA Device being upgraded. If the writing of the transfer output fails, then pre-rollback can be written. However, the transfer output cannot be written after the pre-rollback has been written.

Before a rollback is performed, the Ink Refill QA Device must confirm that the sequence fields was successfully written to the pre-rollback values in the Ink QA Device. Because the sequence fields are Decrement-Only fields, the Ink QA Device will allow pre-rollback output to be written only if the upgrade output has not been written. It also means that the transfer output cannot be written after the pre-rollback values have been written. For a device to be upgradeable the device must have two sequence fields SEQ_1 and SEQ_2 which are written with sequence data during the transfer sequence. Thus all upgrading QA devices, ink QA Devices and printer QA Devices must have two sequence fields. The upgrading QA Devices must also have these fields because they can be upgraded as well. The sequence field information is defined in Table 11.

TABLE 11

Sequence field information

| Attribute Name | Value | Explanation |
|---|---|---|
| Type | TYPE_SEQ_1 or TYPE_SEQ_2. | See Appendix A for exact value. |
| KeyNum | Slot number of the sequence key. | Only the sequence key has authenticated ReadWrite access to this field. |
| Non Auth RW Perm | 0 | Non authenticated ReadWrite is not allowed to the field. |
| Auth RW Perm | 1 | Authenticated (key based) ReadWrite access is allowed to the field. |
| KeyPerm | KeyPerms[KeyNum] = 0 | KeyNum is the slot number of the sequence key, which has ReadWrite permission to the field. |
| | KeyPerms[Slot number of the refill key] = 1 | Refill key can decrement the sequence field. |
| | KeyPerms[others = 0 . . . 7(except refill key)] = 0 | All other keys have ReadOnly access. |
| End Pos | | Set as required. Size is typically 1 word. |

There are three states in an transfer sequence, the first state is initiated for every transfer, while the next two states are initiated only when the transfer fails. The states are—Xfer, StartRollback, and Rollback.

Figure 17:
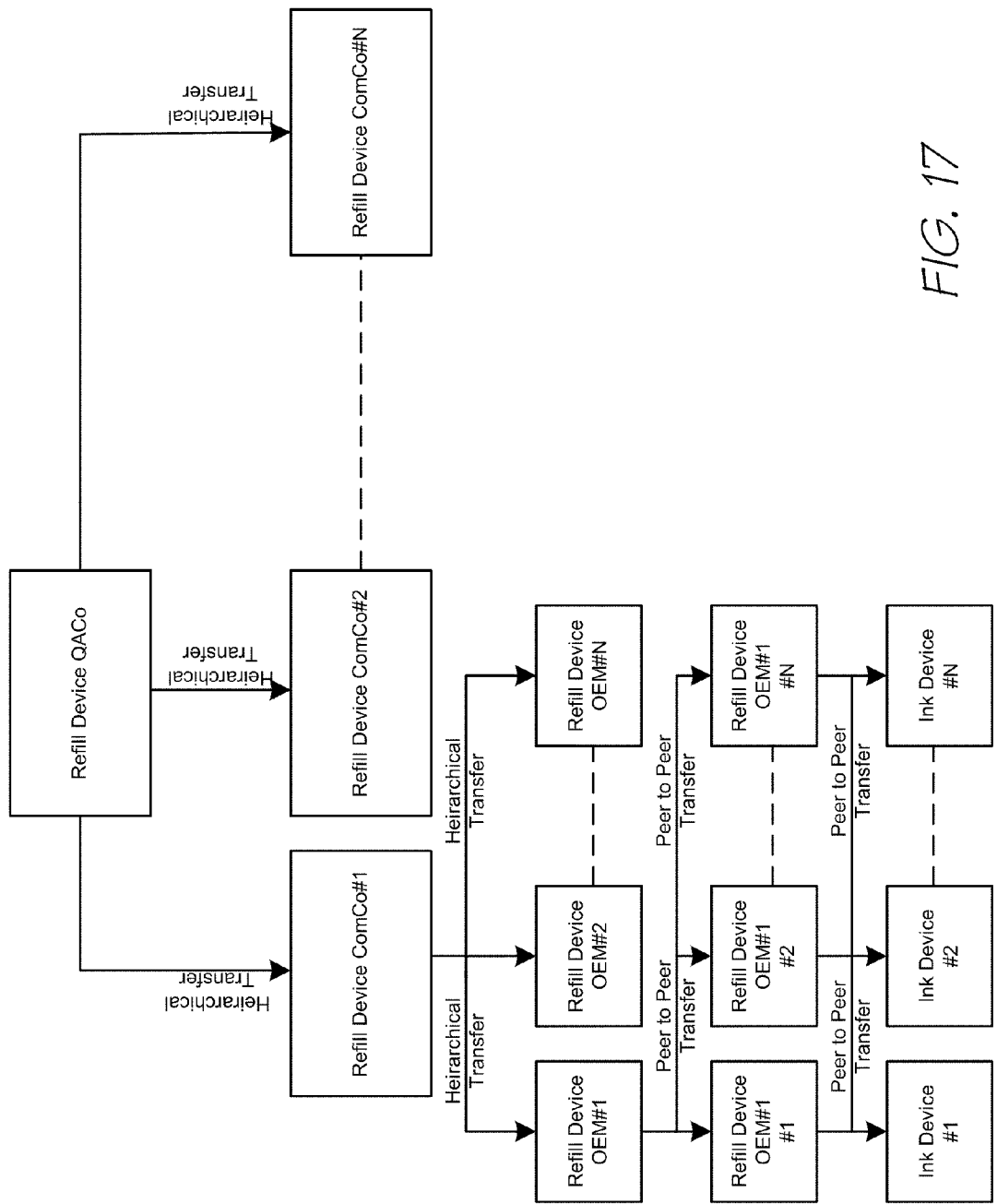
FIG. 17 shows an upgrade flow

FIG. 17 shows a typical upgrade flow. This state indicates the start of the transfer process, and is the only state required if the transfer is successful. During this state, the Ink Refill QA Device adds a new record to its Xfer Entry cache, decrements its amount, produces new amount, new sequence data and a signature based on the refill key.

The Ink QA Device will subsequently write the new amount and new sequence data, after verifying the signature. If the new amount can be successfully written to the Ink QA Device, then this will finish a successful transfer.

If the writing of the new amount is unsuccessful (result returned is BAD SIG), the System will re-transmit the transfer output to the Ink QA Device, by calling the authenticated Write function on it again, using the same transfer output.

If retrying to write the same transfer output fails repeatedly, the System will start the rollback process on Ink Refill QA Device, by calling the Read function on the Ink QA Device, and subsequently calling the StartRollBack function on the Ink Refill QA Device. After a successful rollback is performed, the System will invoke the transfer sequence again. This state indicates the start of the rollback process. During this state, the Ink Refill QA Device produces the next sequence data and a signature based on the refill key. This is also called a pre-rollback.

The pre-rollback output can only be written to the Ink QA Device, if the previous transfer output has not been written. The writing of the pre-rollback sequence data also ensures, that if the previous transfer output was captured and not applied, then it cannot be applied to the Ink QA Device in the future.

If the writing of the pre-rollback output is unsuccessful (result returned is BAD SIG), the System will re-transmit the pre-rollback output to the Ink QA Device, by calling the authenticated Write function on it again, using the same pre-rollback output.

If retrying to write the same pre-rollback output fails repeatedly, the System will call the StartRollback on the Ink Refill QA Device again, and subsequently calling the authenticated Write function on the Ink QA Device using this output.

This state indicates a successful deletion (completion) of a transfer sequence. During this state, the Ink Refill QA Device verifies the sequence data produced from StartRollBack has been correctly written to Ink Refill QA Device, then rolls its ink-remaining field to a previous value before the transfer request was issued.

The Xfer Entry data structure must allow for the following:
Stores the transfer state and sequence data for a given transfer sequence.
Store all data corresponding to a given transfer, to facilitate a rollback to the previous value before the transfer output was generated.

The Xfer Entry cache depth will depend on the QA Chip Logical Interface implementation. For some implementations a single Xfer Entry value will be saved. If the Ink Refill QA Device has no powersafe storage of Xfer Entry cache, a power down will cause the erasure of the Xfer Entry cache and the Ink Refill QA Device will not be able to rollback to a pre-power-down value.

A dataset in the Xfer Entry cache will consist of the following:
Information about the QA Device being upgraded:
a. ChipId of the device.
b. FieldNum of the M0 field (i.e what was being upgraded).

Information about the upgrading QA Device:
a. FieldNum of the M0 field used to transfer the amount from.
 XferVal—the transfer amount.
 Xfer State—indicating at which state the transfer sequence is. This will consist of:
a. State definition which could be one of the following:— Xfer, StartRollBack and complete/deleted.
b. The value of sequence data fields SEQ 1 and SEQ 2.

A new dataset is added to Xfer Entry cache by the Xfer function.

There are three methods which can be used to add new dataset to the Xfer Entry cache. The methods have been listed below in the order of their priority:

1. Replacing existing dataset in Xfer Entry cache with new dataset based on ChipId and FieldNum of the Ink QA Device in the new dataset. A matching ChipId and FieldNum could be found because a previous transfer output corresponding to the dataset stored in the Xfer Entry cache has been correctly received and processed by the Ink Refill QA Device, and a new transfer request for the same Ink QA Device, same field, has come through to the Ink Refill QA Device.
2. Replace existing dataset cache with new dataset based on the Xfer State. If the Xfer State for a dataset indicates deleted (complete), then such a dataset will not be used for any further functions, and can be overwritten by a new dataset.
3. Add new dataset to the end of the cache. This will automatically delete the oldest dataset from the cache regardless of the Xfer State.

There can be three types of transfer:
Peer to Peer Transfer—This transfer could be one of the 2 types described below:
a. From an Ink Refill QA Device to a Ink QA Device. This is performed when the Ink QA Device is refilled by the Ink Refill QA Device.
b. From one Ink Refill QA Device to another Ink Refill QA Device, where both QA Devices belong to the same OEM. This is typically performed when OEM divides ink from one Ink Refill QA Device to another Ink Refill QA Device, where both devices belong to the same OEM
Heirachical Transfer—This is a transfer from one Ink Refill QA Device to another Ink Refill QA Device, where the QA Devices belong to different organisation, say ComCo and OEM. This is typically performed when ComCo divides ink from its refill device to several refill devices belonging to several OEMs.

Figure 18:
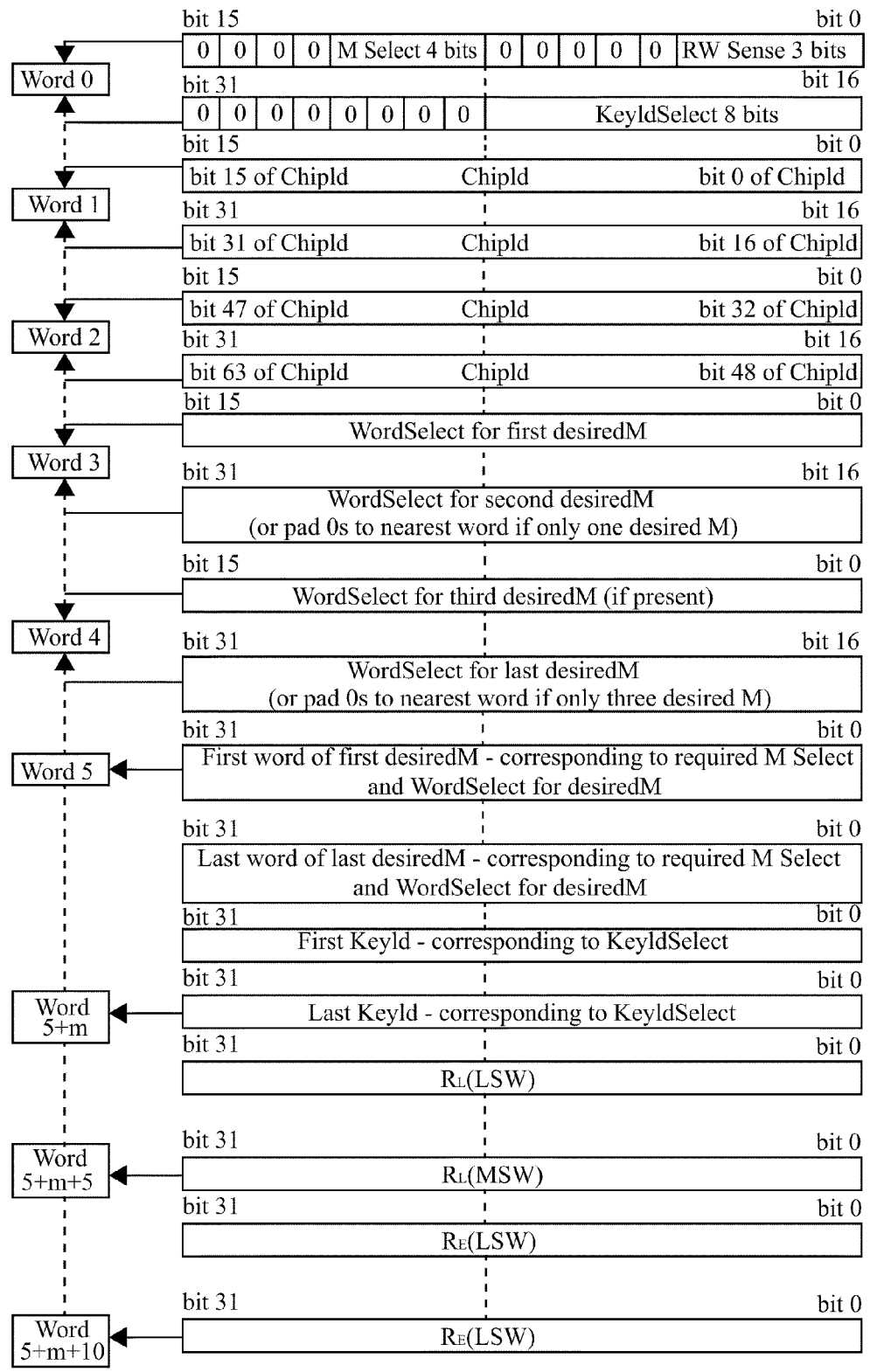
FIG. 18 shows authorised ink refill paths in the printing system

FIG. 18 is a representation of various authorised ink refill paths in the printing system. Referring to FIG. 18, this transfer is typically performed when ink is transferred from ComCo's Ink Refill QA Device to OEM's Ink Refill QA Device, or from QACo's Ink Refill QA Device to ComCo's Ink Refill QA Device.

We will explain this using a transfer from ComCo to OEM.
There is an ink-remaining field associated with the ComCo's Ink Refill QA Device. This ink-remaining field has two keys associated with:
The first key transfers ink to the device from another refill device (which is higher in the heirachy), fills/refills (upgrades) the device itself This key has authenticated ReadWrite permission to the field.
The second key transfers ink from it to other devices (which are lower in the heirachy), fills/refills (upgrades) other devices from it. This key has authenticated decrement-only permission to the field.

There is an ink-remaining field associated with the OEM's Ink refill device. This ink-remaining field has a single key associated with:

This key transfers ink to the device from another refill device (which is higher or at the same level in the hierarchy), fills/refills (upgrades) the device itself and additionally transfers ink from it to other devices (which are lower in the heirachy), fills/refills (upgrades) other devices from it. Therefore, this key has both authenticated ReadWrite and decrement-only permission to the field.

For a successful transfer ink from ComCo's refill device to an OEM's refill device, the ComCo's refill device and the OEM's refill device must share a common key or a variant key. This key is fill/refill key with respect to the OEM's refill device and it is the transfer key with respect to the ComCo's refill device.

For a ComCo to successfully fill/refill its refill device from another refill device (which is higher in the heirachy possibly belonging to the QACo), the ComCo's refill device and the QACo's refill device must share a common key or a variant key. This key is fill/refill key with respect to the ComCo's refill device and it is the transfer key with respect to the QACo's refill device.

Table 12 shows the field information for an $_{M0}$ field storing logical ink-remaining amounts in the refill device and which has the ability to transfer down the heirachy.

Referring to FIG. 18, this transfer is typically performed when ink is transferred from OEM's Ink Refill Device to another Ink Refill Device belonging to the same OEM, or OEM's Ink Refill Device to Ink Device belonging to the same OEM.

There is an ink-remaining field associated with the refill device which transfers ink amounts to other refill devices (peer devices), or to other ink devices. This ink-remaining field has a single key associated with:

This key transfers ink to the device from another refill device (which is higher or at the same level in the heirachy), fills/refills (upgrades) the device itself and additionally transfers ink from it to other devices (which are lower in the heirachy), fills/refills (upgrades) other devices from it.

This key is referred to as the fill/refill key and is used for both fill/refill and transfer. Hence, this key has both ReadWrite and Decrement-Only permission to the ink-remaining field in the refill device.

Table 13 shows the field information for an $_{M0}$ field storing logical ink-remaining amounts in the refill device with the ability to transfer between peers.

TABLE 12

| | field information | |
|---|---|---|
| Attribute Name | Value | Explanation |
| Type | For e.g - TYPE_HIGHQUALITY_BLACK_INK[a] | Type describing the logical ink stored in the ink-remaining field in the refill device. |
| KeyNum | Slot number of the refill key. | Only the refill key has authenticated ReadWrite access to this field. |
| Non Auth RW Perm[b] | 0 | Non authenticated ReadWrite is not allowed to the field. |
| Auth RW Perm[c] | 1 | Authenticated (key based) ReadWrite access is allowed to the field. |
| KeyPerm | KeyPerms[KeyNum] = 0 | KeyNum is the slot number of the refill key, which has ReadWrite permission to the field. |
| | KeyPerms[Slot Num of transfer key] = 1 | Transfer key can decrement the field. |
| | KeyPerms[others = 0 . . . 7(except transfer key)] = 0 | All other keys have ReadOnly access. |
| End Pos | Set as required. | Depends on the amount of logical ink the device can store and storage resolution - i.e in picoliters or in microliters. |

[a]This is a sample type only.

[b]Non authenticated Read Write permission.

[c]Authenticated Read Write permission.

TABLE 13

| | field information | |
|---|---|---|
| Attribute Name | Value | Explanation |
| Type | For e.g - TYPE_HIGHQUALITY_BLACK_INK[a] | Type describing the logical ink stored in the ink-remaining field in the refill device. |
| KeyNum | Slot number of the refill key. | Only the refill key has authenticated ReadWrite access to this field. |
| Non Auth RW Perm[b] | 0 | Non authenticated ReadWrite is not allowed to the field. |
| Auth RW Perm[c] | 1 | Authenticated (key based) ReadWrite access is allowed to the field. |
| KeyPerm | KeyPerms[KeyNum] = 1 | KeyNum is the slot number of the refill key, which has ReadWrite and Decrement permission to the field. |
| | KeyPerms[others = 0 . . . 7 (except KeyNum)] = 0 | All other keys have ReadOnly access. |
| End Pos | Set as required. | Depends on the amount of logical ink the device can store and storage resolution - i.e in picoliters or in microliters. |

[a]This is a sample type only.
[b]Non authenticated Read Write permission.
[c]Authenticated Read Write permission.

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:

1. A method of attempting a write to a first integrated circuit to cause performance of an action, the method comprising the steps of:
    sending a first message to the first integrated circuit, the first message being configured to cause the first integrated circuit to perform the action and to adjust initial values in respective security fields of the first integrated circuit to respective first adjusted values; and
    sending a second message to the first integrated circuit, the second message being configured to cause the first integrated circuit to adjust the initial values in the respective security fields to respective second adjusted values;
    wherein the security fields have associated write restrictions which prevent values in the security fields being adjusted:
        in accordance with the first message, if the initial values have been adjusted in accordance with the second message; and
        in accordance with the second message, if the initial values have been adjusted in accordance with the first message,
    the action is only performed when the initial values in the security fields have been adjusted in accordance with the first message, and
    the respective first adjusted values are different than the respective second adjusted values.

2. A method according to claim 1, wherein the second message is sent in response to a notification that the first message was not successfully performed.

3. A method according to claim 1, wherein the second message is sent in response to a notification that the first message was not received.

4. A method according to claim 1, wherein the second message is sent after a predetermined time has elapsed after sending the first message without receiving confirmation of the first message being received or successfully performed.

5. A method according to claim 1, wherein the messages are sent by a second integrated circuit.

6. A method according to claim 5, wherein the second integrated circuit is a printer controller.

7. A method according to claim 6, wherein the first integrated circuit is installed in a cartridge that is releasably attachable to a printer having the printer controller.

8. A method according to claim 7, wherein the performance of the action causes writing of ink remaining data in a data field of the first integrated circuit as an indicator of ink remaining in the cartridge.

* * * * *